US012663673B2

(12) United States Patent
Cheng

(10) Patent No.: US 12,663,673 B2
(45) Date of Patent: Jun. 23, 2026

(54) LIGHT-MODULATING UNIT AND DISPLAY DEVICE USING THE SAME

(71) Applicant: Lextar Electronics Corporation, Hsinchu City (TW)

(72) Inventor: Hsu-Wen Cheng, Hsinchu (TW)

(73) Assignee: Ennostar Corporation, Hsinchu City (TW)

( * ) Notice: Subject to any disclaimer, the term of this patent is extended or adjusted under 35 U.S.C. 154(b) by 0 days.

(21) Appl. No.: 19/096,489

(22) Filed: Mar. 31, 2025

(65) Prior Publication Data

US 2025/0328046 A1　Oct. 23, 2025

(30) Foreign Application Priority Data

Apr. 19, 2024　(TW) .................................. 113114649

(51) Int. Cl.
G02F 1/13357 (2006.01)

(52) U.S. Cl.
CPC .. G02F 1/133605 (2013.01); G02F 1/133603 (2013.01)

(58) Field of Classification Search
CPC ......... G02F 1/133607; G02F 1/133603; G02F 1/144607; G02B 6/0021; G02B 6/0036; G02B 5/0055; G02B 6/0043; G02B 6/0035; G02B 6/0055; H10H 20/856; H10H 29/856
See application file for complete search history.

100

(56) References Cited

U.S. PATENT DOCUMENTS

| | | | | |
|---|---|---|---|---|
| 2005/0237765 A1* | 10/2005 | Suehiro | ............... | H10H 20/853 |
| | | | | 257/E33.074 |
| 2011/0090672 A1* | 4/2011 | Zhu | .................... | G02F 1/133611 |
| | | | | 362/350 |
| 2014/0211503 A1* | 7/2014 | Tarsa | ................... | G02B 6/0036 |
| | | | | 362/608 |
| 2015/0330583 A1* | 11/2015 | Ye | ........................ | H10H 20/853 |
| | | | | 362/257 |
| 2020/0285111 A1* | 9/2020 | Chen | ................. | G02F 1/133603 |
| 2021/0096427 A1* | 4/2021 | Yagi | ..................... | G02B 6/0036 |
| 2021/0223455 A1* | 7/2021 | Tan | ................... | G02F 1/133615 |
| 2023/0314874 A1 | 10/2023 | Kim et al. | | |

FOREIGN PATENT DOCUMENTS

| | | | |
|---|---|---|---|
| CN | 115469394 A | | 12/2022 |
| JP | 2006286217 A | * | 10/2006 |
| TW | 200515058 A | | 5/2005 |
| TW | 202028825 A | | 8/2020 |
| TW | 202037949 A | | 10/2020 |

\* cited by examiner

*Primary Examiner* — Erin Kryukova
(74) *Attorney, Agent, or Firm* — Patterson + Sheridan, LLP

(57) ABSTRACT

A light-modulating unit is provided. The light-modulating unit includes a light-modulating structure that has a light-emitting surface and a bottom surface that are opposite to each other. The light-modulating structure includes a housing cavity that extends from the bottom surface into the interior of the light-modulating structure. The light-modulating unit also includes a light-emitting element disposed in the housing cavity. The light-modulating unit further includes a light-reflecting array structure disposed on the light-emitting surface and directly above the light-emitting element. The light-reflecting array structure includes multiple grooves that form an m×n array, where m and n are positive integers greater than or equal to 2.

14 Claims, 25 Drawing Sheets

100

100

102

102'

20T

20

40

20d4

20d3

20d1

20d2

104

20

20B

20C

20e

LIGHT-MODULATING UNIT AND DISPLAY DEVICE USING THE SAME

CROSS REFERENCE TO RELATED APPLICATIONS

This application claims priority of Taiwan Patent Application No. 113114649, filed on Apr. 19, 2024, the entirety of which is incorporated by reference herein.

Technical Field

The disclosure relates to a light-modulating unit and a display device using the same, particularly to a light-modulating unit that includes a light-reflecting array structure and a display device using the same.

BACKGROUND OF THE INVENTION

Description of the Related Art

The principle and structure of light emission from a light-emitting diode (LED) are different from those of traditional light sources, offering advantages such as low power consumption, long component life, and fast response time. Additionally, LEDs are small in size, shock-resistant, and suitable for mass production, making them easily adaptable to the needs of applications requiring small-sized or array-based components, leading to their widespread use in the market.

One application of LEDs is to be used in the backlight modules of liquid crystal displays (LCDs). Backlighting techniques for LCDs are mainly divided into direct type and edge type. Direct-typed backlighting can achieve local dimming, and to enhance screen brightness and contrast, making the display more realistic, direct-typed backlight modules often use many LED light sources to achieve more uniform brightness. However, this results in high costs. To reduce the number of LEDs, LEDs are combined with lenses to spread light, but this approach increases the overall thickness of the display.

SUMMARY

Some embodiments of the present disclosure provide a light-modulating unit that includes a light-reflecting array structure and a display device using the light-modulating unit. The light-reflecting array structure may convert a light source (e.g., LEDs) into a large-area planar light source that has uniformly bright within a thin thickness and achieve local dimming. Moreover, in some embodiments, a large-sized backlight modules of a display device may be assembled by combining multiple light-modulating units.

The embodiments of the present disclosure include a light-modulating unit. The light-modulating unit includes a light-modulating structure that has a light-emitting surface and a bottom surface that are opposite to each other. The light-modulating structure includes a housing cavity that extends from the bottom surface into the interior of the light-modulating structure. The light-modulating unit also includes a light-emitting element disposed in the housing cavity. The light-modulating unit further includes a light-reflecting array structure disposed on the light-emitting surface and directly above the light-emitting element. The light-reflecting array structure includes multiple grooves that form an m×n array, where m and n are positive integers greater than or equal to 2.

The embodiments of the present disclosure include a display device. The display device includes a display panel and a backlight module disposed on the back side of the display panel. The backlight module includes a substrate that has multiple light-modulating zones, and each light-modulating zone includes the aforementioned light-modulating unit. The display device further includes multiple driving devices disposed on the substrate and driving the corresponding light-modulating unit of each light-modulating zone.

BRIEF DESCRIPTION OF THE DRAWINGS

Aspects of the embodiments of the present disclosure can be understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
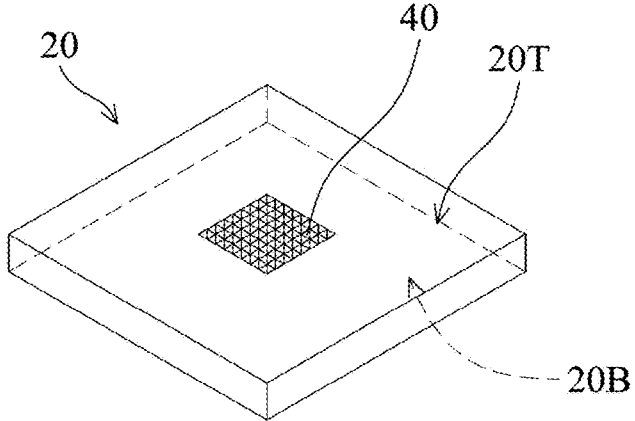
FIG. 1 is a perspective schematic diagram illustrating the light-modulating unit according to some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which the present disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

Figure 2:
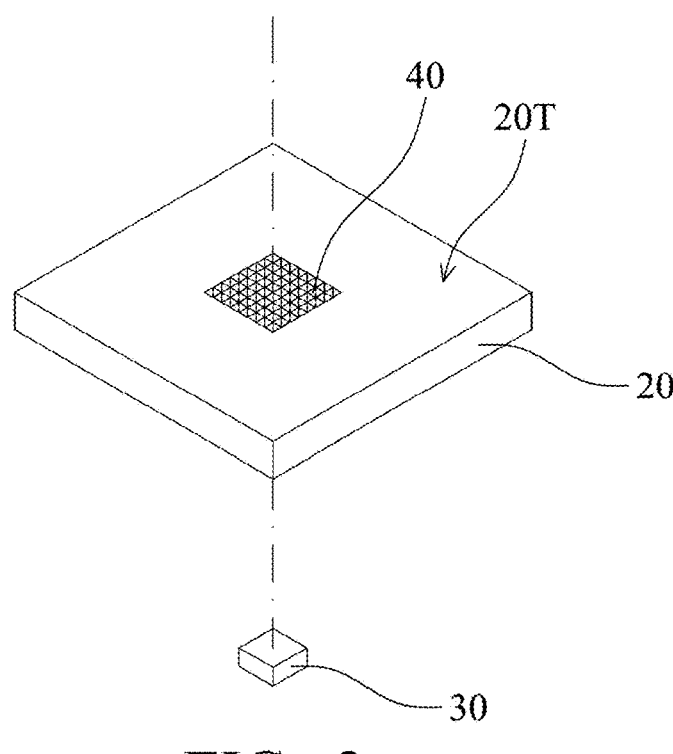
FIG. 2 is an exploded view of the light-modulating unit according to some embodiments of the present disclosure.
Figure 3A:
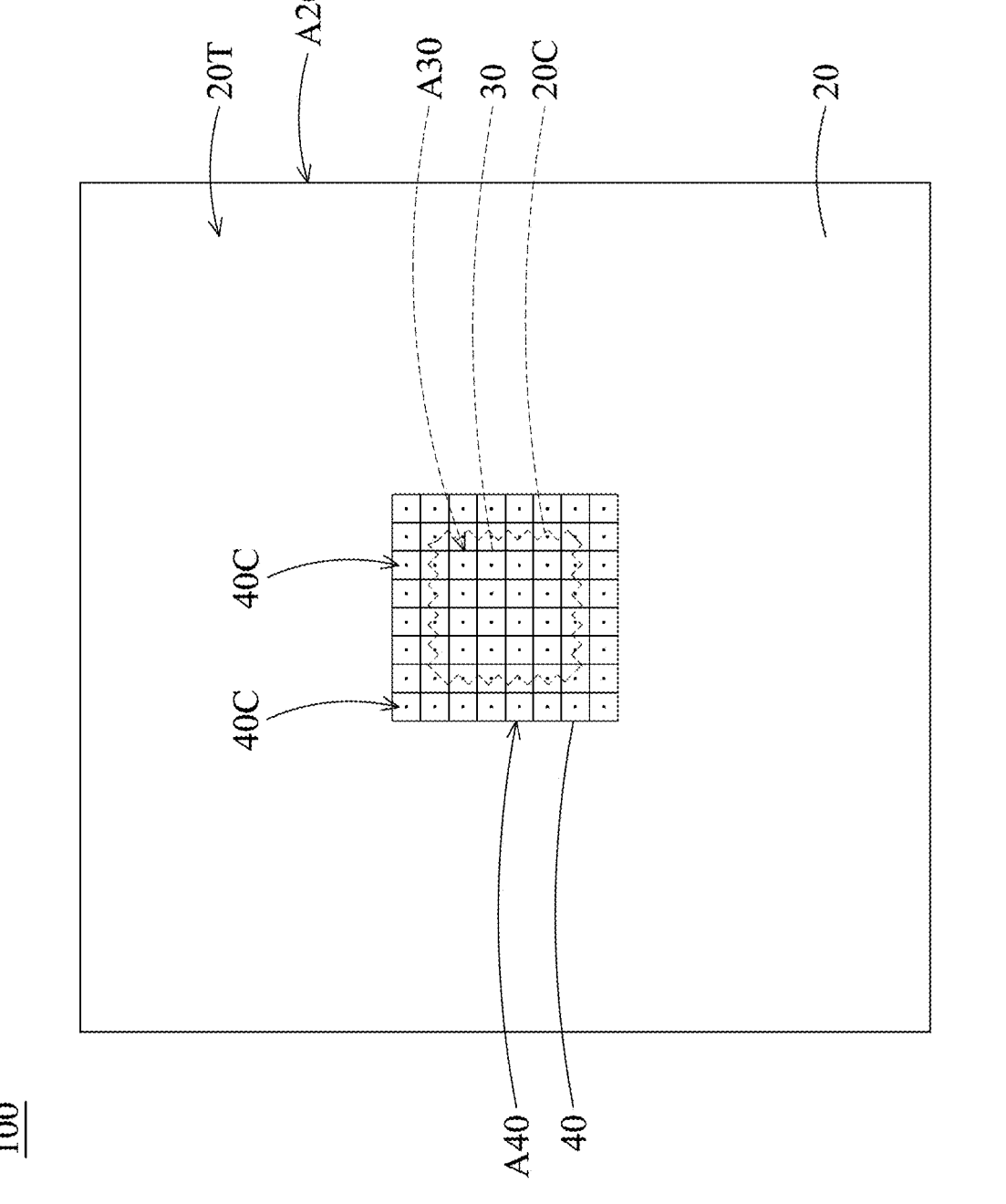
FIG. 3A is a top view of the light-modulating unit according to some embodiments of the present disclosure.
Figure 3B:
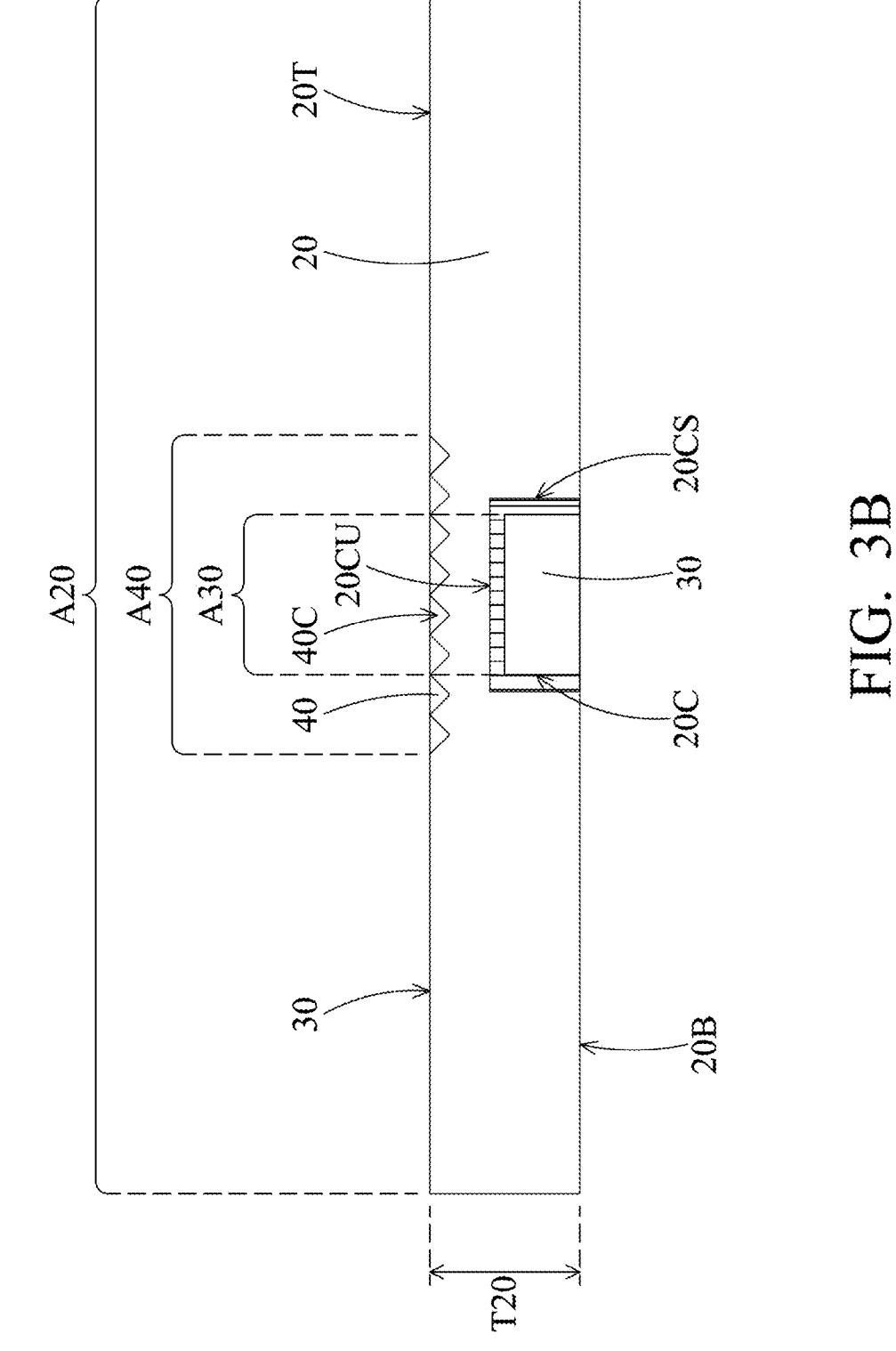
FIG. 3B is a cross-sectional view of the light-modulating unit according to some embodiments of the present disclosure.

FIG. 1 is a perspective schematic diagram illustrating the light-modulating unit 100 according to some embodiments of the present disclosure. FIG. 2 is an exploded view of the light-modulating unit 100 according to some embodiments of the present disclosure. FIG. 3A is a top view of the light-modulating unit 100 according to some embodiments of the present disclosure. FIG. 3B is a cross-sectional view of the light-modulating unit 100 according to some embodiments of the present disclosure. It should be noted that some components of the light-modulating unit 100 have been omitted in FIG. 1 to FIG. 3B for the sake of brevity. Moreover, FIG. 1 to FIG. 3B may not correspond exactly to each other.

Referring to FIG. 1 to FIG. 3B, in some embodiments, the light-modulating unit 100 includes a light-modulating structure 20 having a light-emitting surface 20T and a bottom surface 20B that are opposite to each other. As shown in FIG. 3B, the light-modulating structure 20 includes a housing cavity 20C that extends from the bottom surface 20B of the light-modulating structure 20 into the interior of the light-modulating structure 20. The light-modulating unit 100 includes a light-emitting element 30 disposed in the housing cavity 20C, where the top surface 20CU and sidewalls 20CS of the housing cavity 20C serve as the light incident surfaces for the light-emitting element 30.

As shown in FIG. 1 to FIG. 3B, in some embodiments, the light-modulating unit 100 includes a light-reflecting array structure 40 that is disposed on the light-emitting surface 20T of the light-modulating structure 20 and directly above the light-emitting element 30. As shown in FIG. 3A and FIG. 3B, the light-reflecting array structure 40 includes multiple grooves 40C that form an m×n array, where m and n are positive integers greater than or equal to 2. For example, in this embodiment, the grooves 40C of the light-reflecting array structure 40 form an 8×8 array, but the present disclosure is not limited thereto. In some embodiments, the light-reflecting array structure 40 may be fabricated by injection molding using a mold.

As shown in FIG. 3A, in some embodiments, in the top view of the light-modulating unit 100, the shape of the light-modulating structure 20 is rectangular. Moreover, as shown in FIG. 3A and FIG. 3B, in some embodiments, the area A40 of the light-reflecting array structure 40 is greater than or equal to the area A30 of the light-emitting element 30 and less than the area A20 of the light-emitting surface 20T of the light-modulating structure 20.

In some embodiments, the light-emitting element 30 is a multi-faceted light source, capable of emitting light from its sides as well as from the top for example. The side emission from the light-emitting element 30 may enter the body of the light-modulating structure 20 through the sidewalls 20CS of the housing cavity 20C. Additionally, the top emission from the light-emitting element 30 may partially be reflected back into the light-modulating structure 20 by the light-reflecting array structure 40 after emerging from the top surface 20CU of the housing cavity 20C. That is, the light-reflecting array structure 40 may increase the light entering the body of the light-modulating structure 20. Thus, through the light-modulating structure 20 according to the embodiments of the present disclosure, the efficiency of light utilization is enhanced, converting the light emitted by the light-emitting element 30 into a surface light source having uniformly bright and a larger area.

Figure 4A:
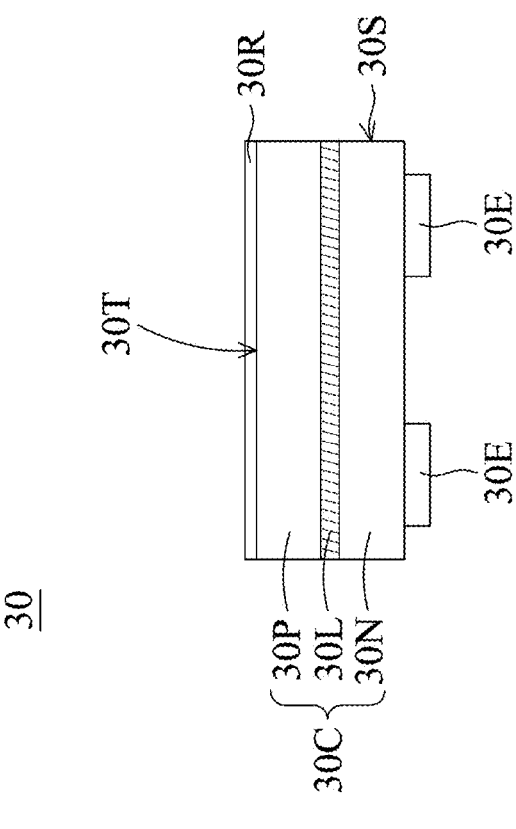
FIG. 4A to FIG. 4I are partial cross-sectional views illustrating the light-emitting element according to some embodiments of the present disclosure.
Figure 4B:
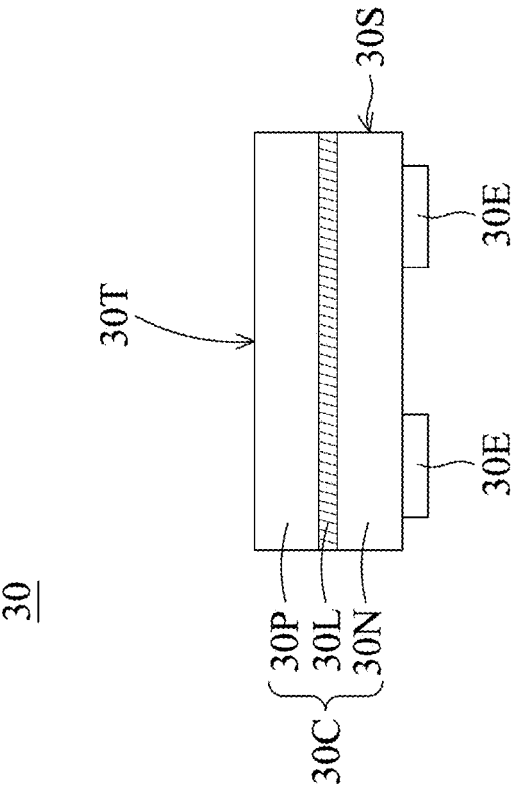

Regarding the multi-faceted light-emitting element 30, some embodiments are described below, but the present disclosure is not limited thereto. FIG. 4A to FIG. 4I are partial cross-sectional views illustrating the light-emitting element 30 according to some embodiments of the present disclosure. Similarly, some components of the light-emitting element 30 have been omitted in FIG. 4A to FIG. 4I for the sake of brevity. As shown in FIG. 4A, in some embodiments, the light-emitting element 30 includes an LED chip 30C with electrodes 30E at the bottom, which is, for example, a flip-chip type LED chip that emits light from five surfaces (i.e., top surface 30T and four side surfaces 30S). As shown in FIG. 4B, in some embodiments, the light-emitting element 30 further includes a reflective layer 30R disposed on the (flip-chip type) LED chip 30C. More specifically, the reflective layer 30R may be disposed on the top surface 30T of the (flip-chip type) LED chip 30C to partially reflect and partially transmit light from the LED chip 30C, thereby reducing the brightness directly above the LED chip 30C. The reflective layer 30R may be, for example, a white resin layer, a distributed Bragg reflector (DBR), and so on.

As shown in FIG. 4A and FIG. 4B, the LED chip 30C may include an N-type semiconductor layer 30N, a light-emitting layer 30L, and a P-type semiconductor layer 30P. The light-emitting layer 30L is disposed between the N-type semiconductor layer 30N and the P-type semiconductor layer 30P. The light emitted from the LED chip 30C is determined by the light-emitting layer 30L.

The N-type semiconductor layer 30N may include Group II-VI materials (e.g., zinc selenide (ZnSe)) or Group III-V materials (e.g., gallium nitride (GaN), aluminum nitride (AlN), indium nitride (InN), indium gallium nitride (InGaN), aluminum gallium nitride (AlGaN), or aluminum indium gallium nitride (AlInGaN)), and the N-type semiconductor layer 30N may include dopants such as silicon (Si) or germanium (Ge), but the present disclosure is not limited thereto.

The light-emitting layer 30L may include at least one undoped semiconductor layer or at least one low-doped layer. For example, the light-emitting layer may be a quantum well (QW) layer, which may include indium gallium nitride ($In_xGa_{1-x}N$) or gallium nitride (GaN), but the present disclosure is not limited thereto. Alternatively, the light-emitting layer 30L may be a multiple quantum well (MQW) layer.

The P-type semiconductor layer 30P may include Group II-VI materials (e.g., zinc selenide (ZnSe)) or Group III-V materials (e.g., gallium nitride (GaN), aluminum nitride (AlN), indium nitride (InN), indium gallium nitride (InGaN), aluminum gallium nitride (AlGaN), or aluminum indium gallium nitride (AlInGaN)), and the P-type semiconductor layer 30P may include dopants such as magnesium (Mg), carbon (C), etc., but the present disclosure is not limited thereto. Furthermore, both N-type semiconductor layer 30N and P-type semiconductor layer 30P may be a single-layer or multi-layer structure.

In some embodiments, the light-emitting element 30 is a package that includes the LED chip 30C, and it is a package that may provide light emission from the side surfaces 30S. Depending on different application requirements, the light-emitting element 30 may emit different colors of light. For ease of explanation, the following is an embodiment where the light-modulating structure 20 is applied to the backlight module of a display device, paired with a white light LED chip package. Additionally, the white light LED chip package may have various forms, the following uses the packages shown in FIG. 4C to FIG. 4I for illustration, but the packages are not limited thereto.

Figures 4C, 4D:
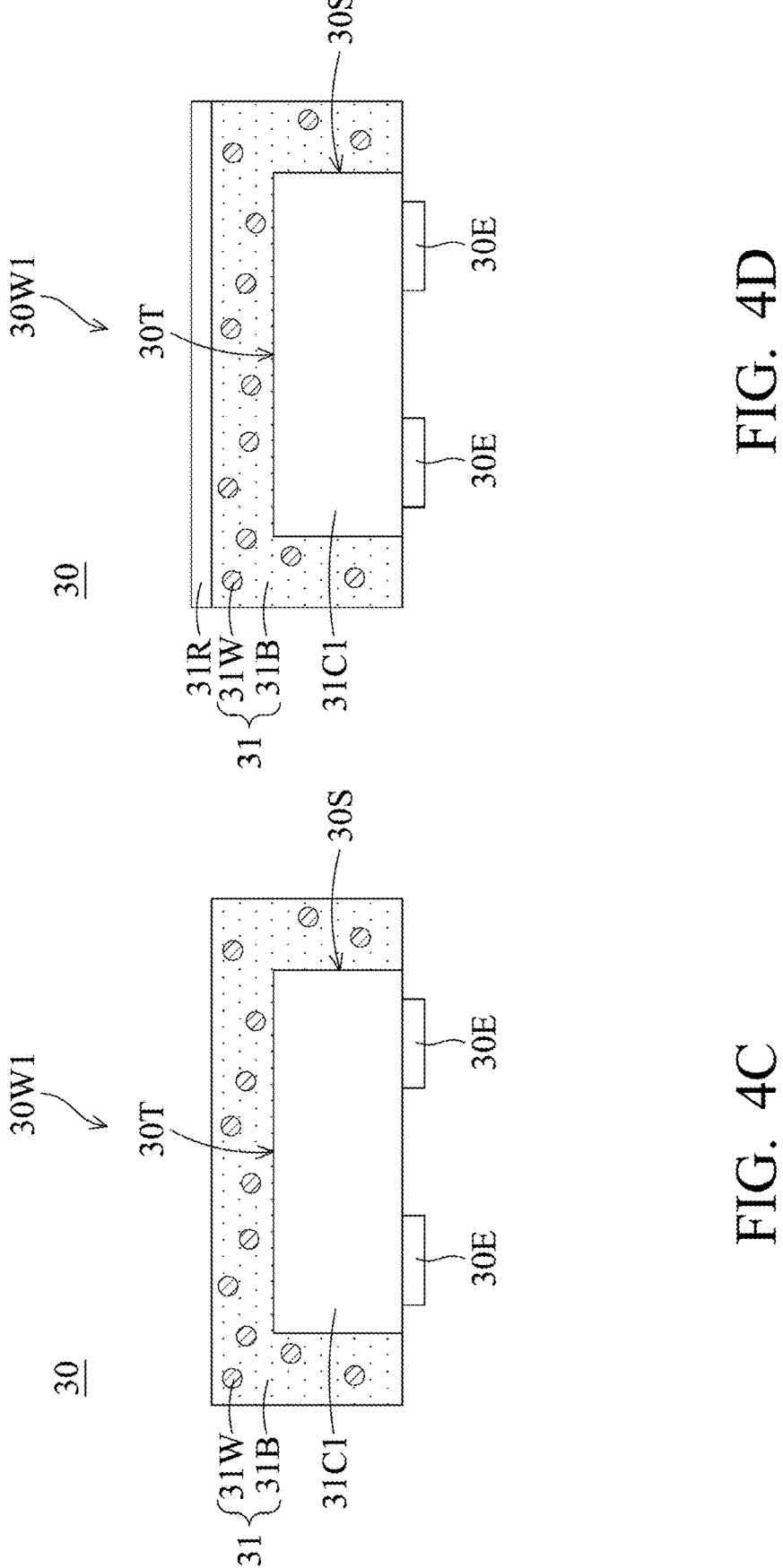

As shown in FIG. 4C, the light-emitting element 30 is a first white light LED package 30W1. The first white light LED package 30W1 may include a first LED chip 30C1 emitting blue light and a first encapsulant 31. The first LED chip 30C1 may be a flip-chip type LED chip. The first encapsulant 31 may include a first transparent matrix 31B and a first wavelength-converting material 31W, wherein the first wavelength-converting material 31W is dispersed within the first transparent matrix 31B. The first white light LED package 30W1 may be a chip-scale package (CSP), wherein the first encapsulant 31 conforms to the contour of the first LED chip 31C1 and covers the top surface 30T and side surface 30S of the first LED chip 31C1. Thus, the first white light LED package 30W1 emits light from five surfaces and may be transformed into a larger area planar light source by the light-modulating structure 20 of the present disclosure. For example, the first transparent matrix 31B may be a transparent resin, such as silicone or epoxy resin. Furthermore, the first wavelength-converting material 31W may include a yellow wavelength-converting material that is used to absorb part of the blue light emitted by the first LED chip 30C1 and convert it into yellow light, and the yellow light mixes with part of the blue light to form white light. The yellow wavelength-converting material may include yellow phosphors, yellow quantum dots, or a mixture of the yellow phosphors and the yellow quantum dots, wherein the yellow phosphor may include, for example, yttrium aluminum garnet (YAG) phosphor or silicate phosphor, and the yellow quantum dots may include, for example, CdSe, but the present disclosure is not limited thereto.

Alternatively, the first wavelength-converting material 31W may include a red and green wavelength-converting material that is used to absorb part of the blue light emitted from the first LED chip 30C1 and convert it into red light and green light, respectively. The red light and the green light mix with part of the blue light to form white light. The red wavelength-converting material may include red phosphors, red quantum dots, or a mixture of the red phosphors and the red quantum dots. The green wavelength-converting materials may include green phosphors, green quantum dots, or a mixture of the green phosphors and the green quantum dots, but the present disclosure is not limited thereto. The aforementioned red phosphors may include, for example, tetravalent manganese-doped red fluoride phosphors (e.g., $K_2GeF_6:Mn^{4+}$, $K_2SiF_6:Mn^{4+}$, $K_2TiF_6:Mn^{4+}$, etc.), (Sr,Ca)$AlSiN_3:Eu^{2+}$, $Ca_2Si_5N_8:Eu^{2+}$, $Sr(LiAl_3N_4):Eu^{2+}$, etc., but the present disclosure is not limited thereto. The aforementioned red quantum dots may include, for example, CdTe, PbS, CdSe/Te, InP/ZnS, CdSe/ZnS, perovskite quantum dots $CsPb(Br_{(1-b)}I_b)_3$, where $0.5 \le b \le 1$, but the present disclosure is not limited thereto. The aforementioned green phosphors may include, for example, $\beta$-SiAlON phosphors, silicate phosphors, but the present disclosure is not limited thereto. The aforementioned green quantum dots may include, for example, CdSe, InP/ZnS, CdSe/ZnS, perovskite quantum dots $CsPb(Br_{(1-b)}I_b)_3$, where $0 \le b < 0.5$, but the present disclosure is not limited thereto.

As shown in FIG. 4D, the first white light LED package may further include a first reflective layer 31R that is disposed on the upper surface of the first encapsulant 31. The first reflective layer 31R may partially transmit and partially reflect the white light emitted by the first white light LED package 30W1, so as to increase the light emission of the first white light LED package 30W1 in the side direction. For example, the first reflective layer 31R may be a white resin that includes white reflective materials mixed with a thermoplastic resin or a thermoset resin. White reflective materials may include, for example, titanium dioxide, aluminum oxide, or silicon dioxide, which may reflect light. The thermoplastic resin may include, for example, polyphthalamide (PPA), while the thermoset resin may include, for example, silicone or epoxy resin.

Figures 4E, 4F:
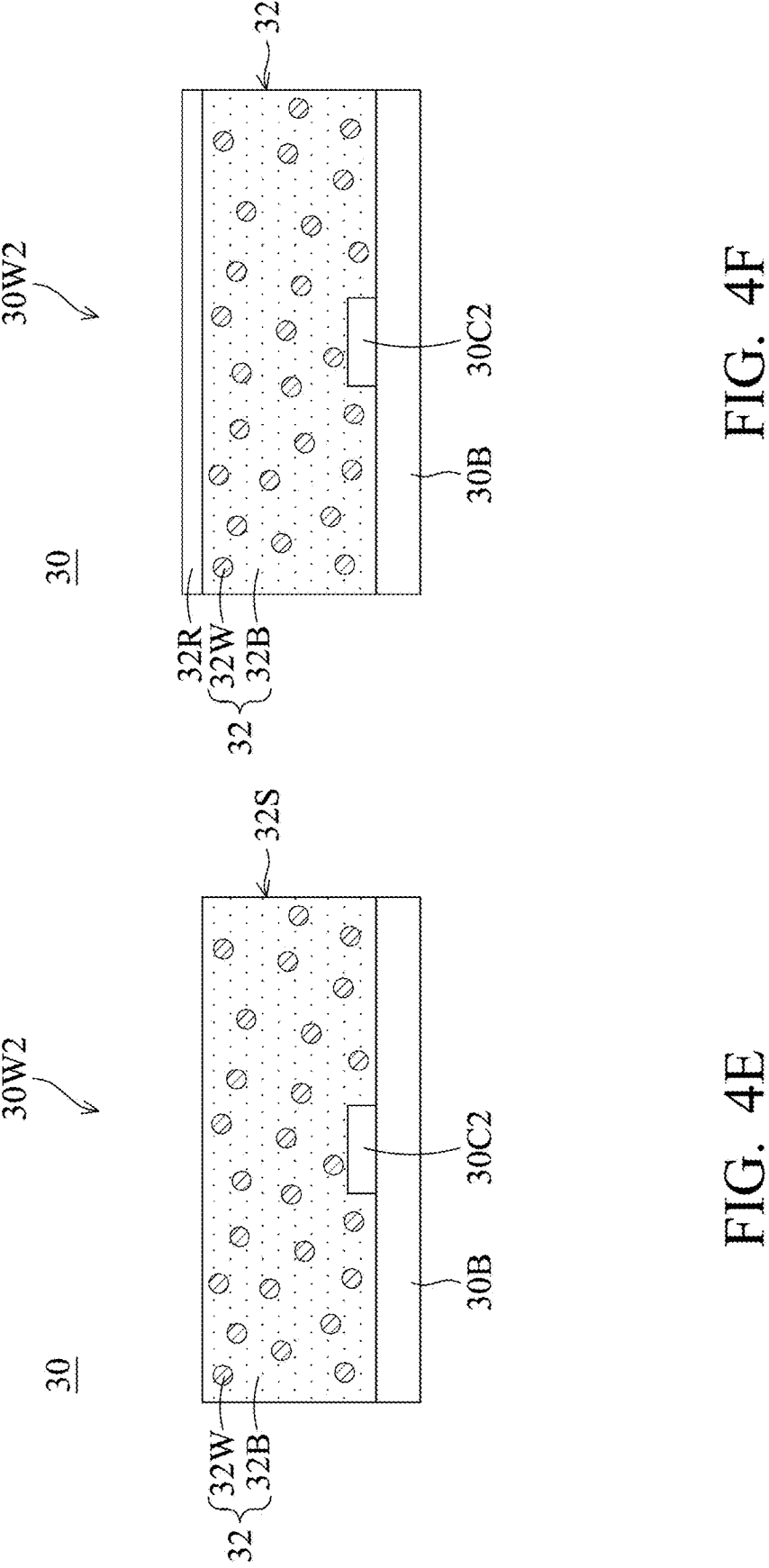

As shown in FIG. 4E, the light-emitting element 30 is a second white light LED package 30W2. The second white light LED package 30W2 may include a substrate 30B, a second LED chip 30C2 emitting blue light, and a second encapsulant 32. The second LED chip 30C2 may be a flip-chip type LED chip. The second LED chip 30C2 is disposed on the substrate 30B, and the second encapsulant 32 is disposed on the surface of the substrate 30B covers the second LED chip 30C2. The second encapsulant 32 may include a second transparent matrix 32B and a second wavelength-converting material 32W, wherein the second wavelength-converting material 32W is dispersed within the second transparent matrix 32B. Similarly, like the aforementioned first encapsulant 31, the second transparent matrix 32B may be a transparent resin, and the second wavelength-converting material 32W may include yellow wavelength-converting materials or red and green wavelength-converting materials to achieve white light emission, details of which are not repeated here.

As shown in FIG. 4F, the second white light LED package 30W2 may further include a second reflective layer 32R that is disposed on the upper surface of the second encapsulant 32. The second reflective layer 32R may partially transmit the upward light from the second white light LED package 30W2, and partially reflect the upward light from the second white light LED package 30W2 onto the second encapsulant 32 for light mixing and then emit light through the side surface 32S of the second encapsulant 32, or partially reflect the light onto the substrate 30B and then reflect through the side surface 32S of the second encapsulant 32 to emit light, thus increasing the side emission from the side surface 32S of the second encapsulant 32. Moreover, the material of the second reflective layer 32R may refer to that of the first reflective layer 31R, details of which are not repeated here.

Figures 4G, 4H:
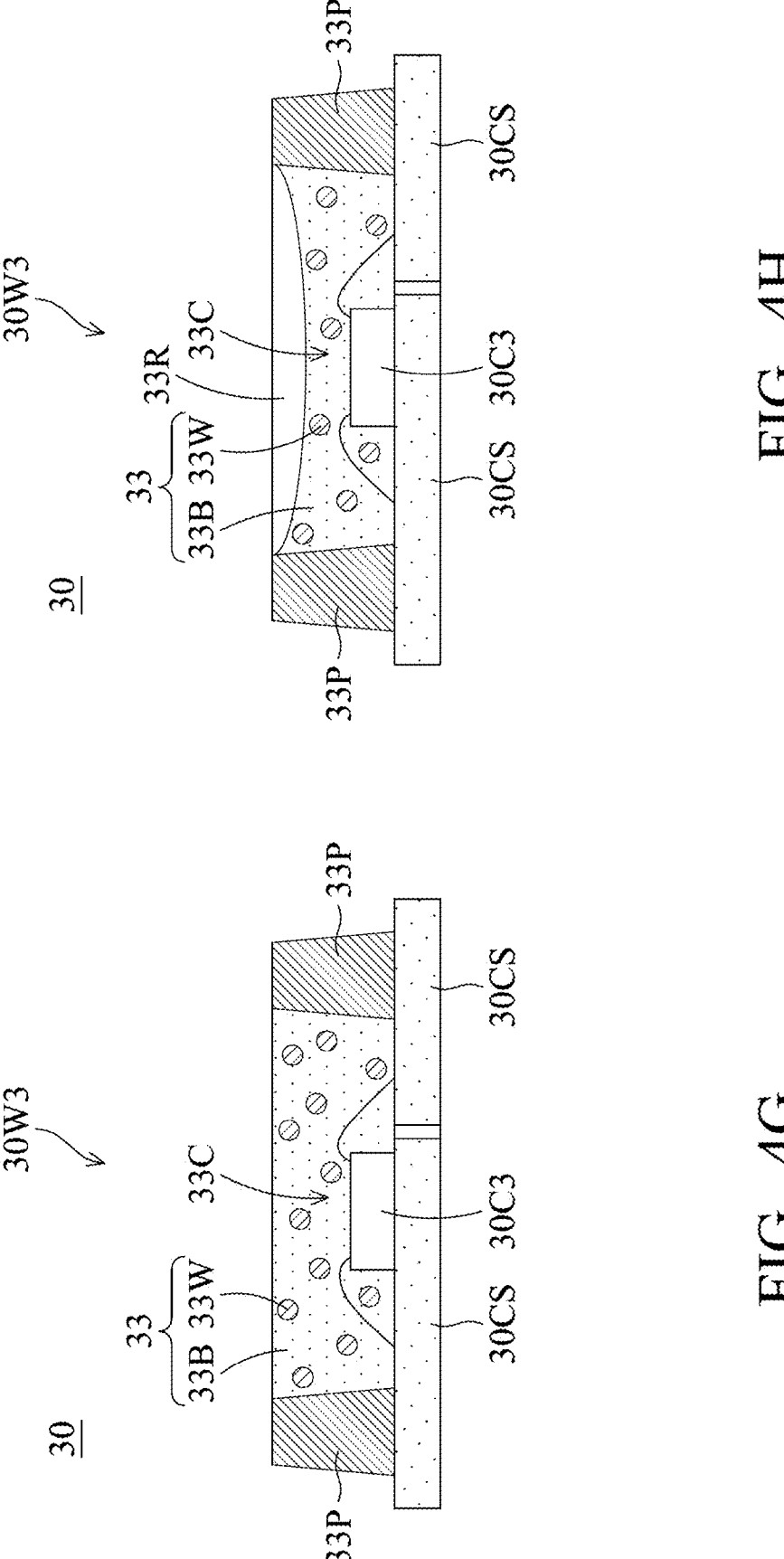

As shown in FIG. 4G, the light-emitting element 30 is a third white light LED package 30W3. The third white light LED package 30W3 may include a pair of conductive leadframes 30CS, a perimeter wall 33P, a third LED chip 30C3, and a third encapsulant 33. The perimeter wall 33P is disposed on the conductive leadframes 30CS, so as to jointly form a containment area 33C, wherein the perimeter wall 33P has properties of transmitting light and reflecting light. The third LED chip 30C3 may emit blue light and is disposed on the conductive leadframes 30CS within the containment area 33C, and may be electrically connected via conductive wires to the conductive leadframes 30CS. The third encapsulant 33 fills the containment area 33C and covers the third LED chip 30CS. The third encapsulant 33 may include a third transparent matrix 33B and a third wavelength-converting material 33W, wherein the third wavelength-converting material 33W is dispersed within the third transparent matrix 33B. Similarly, like the aforementioned first encapsulant 31 or second encapsulant 32, the third transparent matrix 33B may be a transparent resin, and the third wavelength-converting material 33W may include yellow wavelength-converting materials or red and green wavelength-converting materials to achieve a white light emission effect, details of which are not repeated here. Additionally, the perimeter wall 33P may include a white reflective material mixed with a thermoplastic resin or a thermoset resin. Depending on the doping concentration of the white reflective material, the perimeter wall 33P may have properties of transmitting light and reflecting light, wherein the white reflective material may include, for example, a light-reflecting material such as titanium dioxide, aluminum oxide, or silicon dioxide, the thermoplastic resin may include, for example, polyphthalamide (PPA), and the thermoset resin may include, for example, silicone or epoxy resin. In some embodiments, the light transmission rate of the perimeter wall 33P is greater than 30%. Therefore, the perimeter wall 33P may partially transmit and partially reflect the light emitted from the third white light LED package 30W3.

As shown in FIG. 4H, the third white light LED package 30W3 may further include a third reflective layer 33R that covers the upper surface of the third encapsulant 33, wherein third reflective layer 33R has properties of transmitting and reflecting light. The material of the third reflective layer 33R may refer to that of the first reflective layer 31R, details of which are not repeated here. In some embodiments, the third reflective layer 33R may partially transmit the upward light from the third white light LED package 30W3. In some embodiments, the third reflective layer 33R may partially reflect the upward light from the third white light LED package 30W3, for example, reflecting the light to the light-transmissive perimeter wall 33P.

Figure 4I:
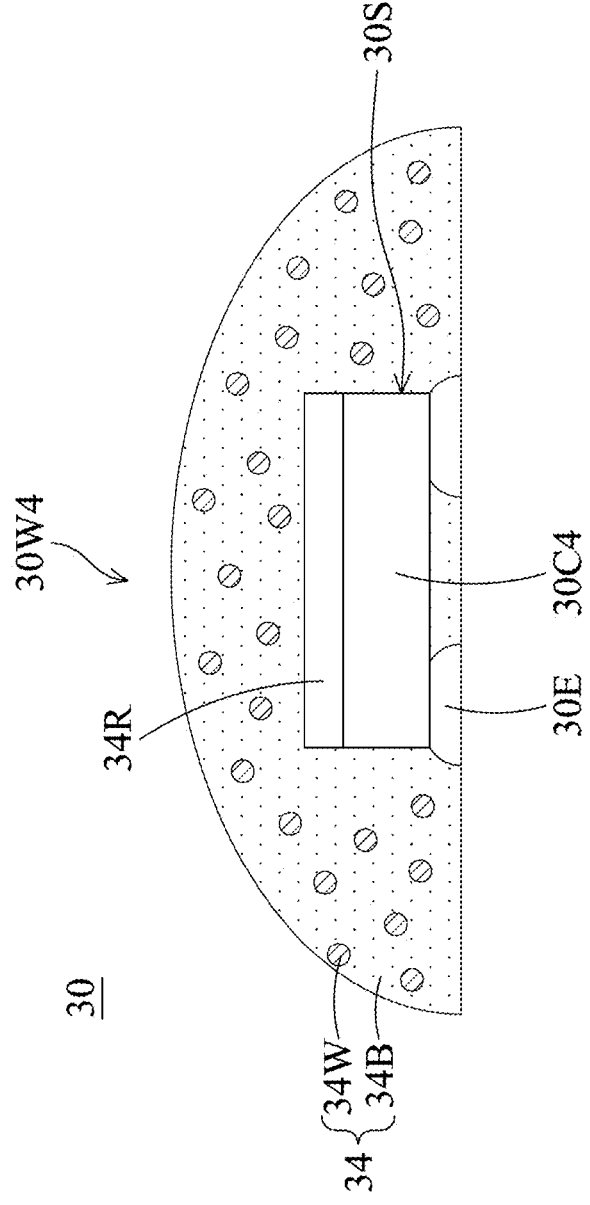

As shown in FIG. 4I, the light-emitting element 30 is a fourth white light LED package 30W4. The fourth white light LED package 30W4 may include a fourth LED chip 30C4 emitting blue light and a fourth encapsulant 34 covering the fourth LED chip 30C4. The fourth LED chip 30C4 is a flip-chip type LED, with a reflective layer 34R (e.g., a distributed Bragg reflector, DBR) on the upper surface, which reduces the light emission directly above the fourth LED chip 30C4 and widens the light distribution on the side surfaces 30S of the fourth LED chip 30C4, resembling a batwing light distribution. The fourth encapsulant 34 is semi-spherical and may include a fourth transparent matrix 34B and a fourth wavelength-converting material 34W, wherein the fourth wavelength-converting material 34W is dispersed within the fourth transparent matrix 34B. Similarly, like the aforementioned first encapsulant 31, second encapsulant 32, or third encapsulant 33, the fourth transparent matrix 34B may be a transparent resin, and the fourth wavelength-converting material 34W may include yellow wavelength-converting materials or red and green wavelength-converting materials to achieve a white light emission effect, details of which are not repeated here.

In some embodiments, smaller LED chips, such as mini LED chips or micro LED chips, may be used according to needs.

Depending on different application requirements, the light-emitting element 30 may be selected from LED chips of different colors, or light-exciting wavelength-converting materials (e.g., fluorescent powder or quantum dots (QD), etc.) emitted by UV LED chips or blue LED chips, to emit the required color of light. For example, the light-emitting element 30 may emit blue light, which includes a blue LED (e.g., blue micro LED); the light-emitting element 30 may emit green light, which includes a green LED (e.g., green micro LED), or the light-emitting element 30 may be a package that includes UV/blue LED chips and green phosphors or green quantum dots; the light-emitting element 30 may emit red light, which includes a red LED (e.g., red micro LED), or the light-emitting element 30 may be a package that includes UV/blue LED chips and red phosphors or red quantum dots, but the present disclosure is not limited thereto. In some other examples, the light-emitting element 30 may also emit other suitable colors of light, which includes the LED of this color or it may be a package that includes UV/blue LED chips and this color's phosphors or quantum dots.

The light-emitting element 30 shown in FIG. 4A to FIG. 4I may be within the housing cavity 20C of the light-modulating structure 20. The side emission of light from the light-emitting element 30 may enter the body of the light-modulating structure 20 through the sidewalls 20CS of the housing cavity 20C, and the upward emission of light from the light-emitting element 30 may emit from the top surface 20CU of the housing cavity 20C and be partially reflected back into the light-modulating structure 20 by the light-reflecting array structure 40. Therefore, the light emitted by the light-emitting element 30 may be converted into a uniformly bright and larger area planar light source through the light-modulating structure 20 of the present disclosure.

FIG. 5A to FIG. 5E are enlarged cross-sectional views illustrating the light-modulating structure 20 according to various embodiments of the present disclosure. As shown in FIG. 5A to FIG. 5D, in some embodiments, the light-modulating structure 20 includes a translucent material, such as poly(methyl methacrylate) (PMMA), polycarbonate (PC), polystyrene (PS), methyl methacrylate styrene (MS), silica gel, any other suitable material, or a combination thereof, but the present disclosure is not limited thereto.

In the cross-sectional view of the light-modulating structure 20, each groove 40C of the light-reflecting array structure 40 is conical and has a first included angle $\theta 1$, and the first included angle $\theta 1$ is less than about 120 degrees. For example, when the material of the light-modulating structure 20 is PMMA with a refractive index of about 1.49, the first included angle $\theta 1$ may be calculated to be less than about 95.69 degrees according to Snell's law, which may cause total reflection of the light emitted by the light-emitting element 30. Furthermore, in some embodiments, the first included angle $\theta 1$ is less than about 90 degrees. The first included angle $\theta 1$ of the groove 40C may cause total reflection (or partial reflection) of the light emitted by the light-emitting element 30, thereby diffusing it around the light-modulating structure 20 to form a uniformly bright large-area planar light source.

In the embodiments shown in FIG. 5A to FIG. 5D, the first included angle $\theta 1$ of each groove 40C is the same. Additionally, as shown in FIG. 5A to FIG. 5D, in some embodiments, the maximum depth D40C of each groove 40C is between about 0.2 mm and about 2 mm. Furthermore, the maximum depth D40C of each groove 40C may be within a range from about 0.2 mm to about 1 mm.

Figure 5A:
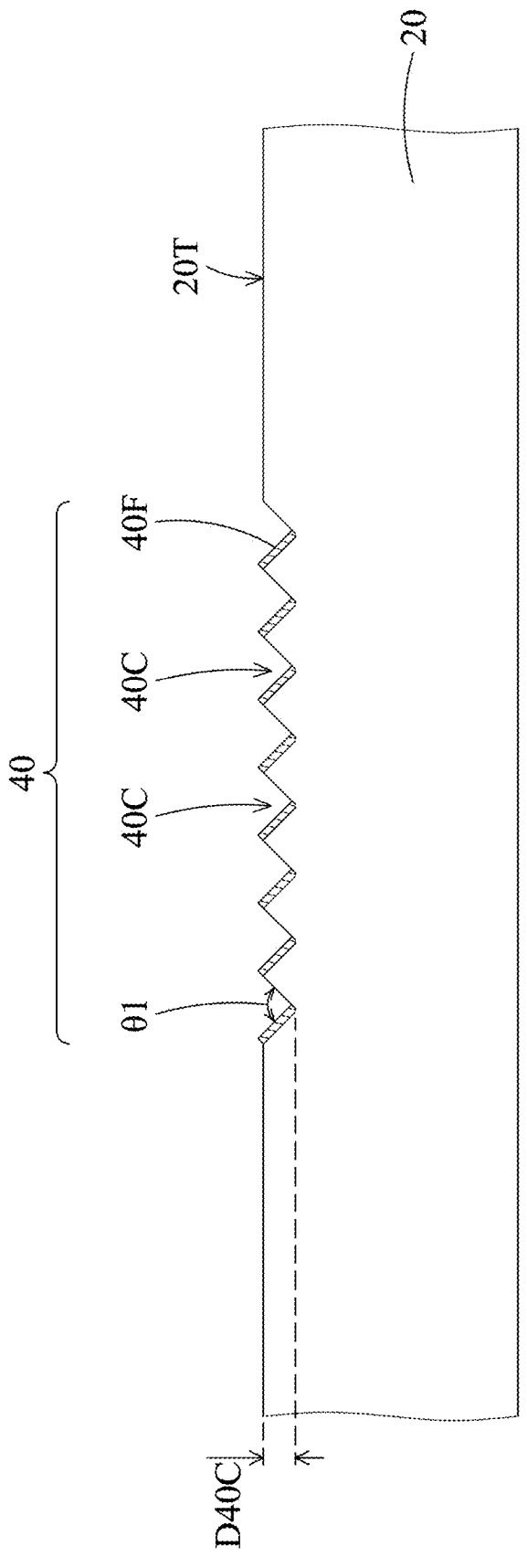
FIG. 5A to FIG. 5E are enlarged cross-sectional views illustrating the light-modulating structure according to various embodiments of the present disclosure.

As shown in FIG. 5A, in this embodiment, the light-reflecting array structure 40 further includes a reflective layer 40F that is coated on at least part of the surfaces of the grooves 40C. For example, the reflective layer 40F may include high reflective materials such as silicon dioxide ($SiO_2$) or titanium dioxide ($TiO_2$). In the cross-section in FIG. 5A, the reflective layer 40F may be coated on the left side surface of each groove 40C using a liquid material (e.g., the aforementioned materials), but the present disclosure is not limited thereto.

Figure 5B:
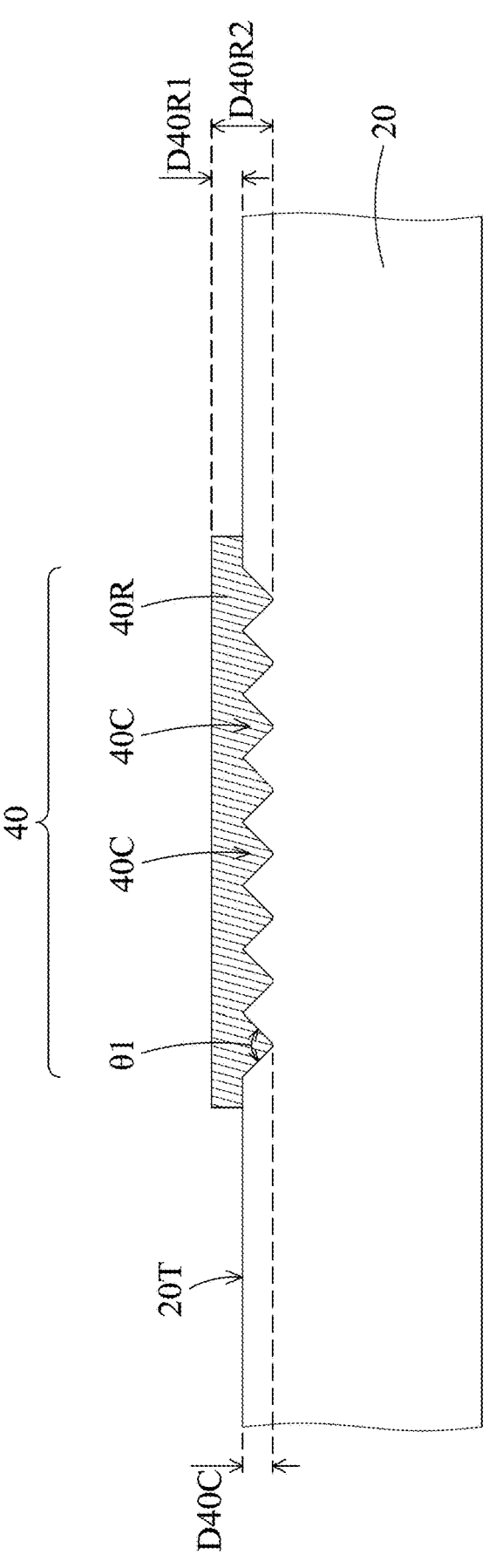
Figure 5C:
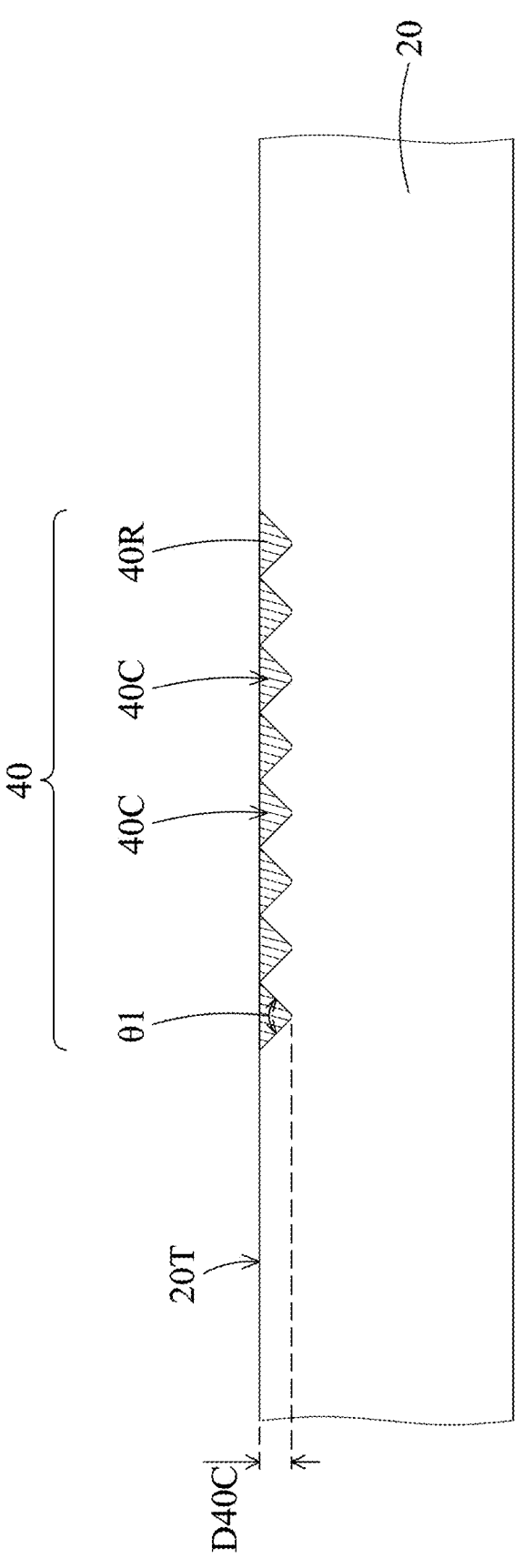
Figure 5D:
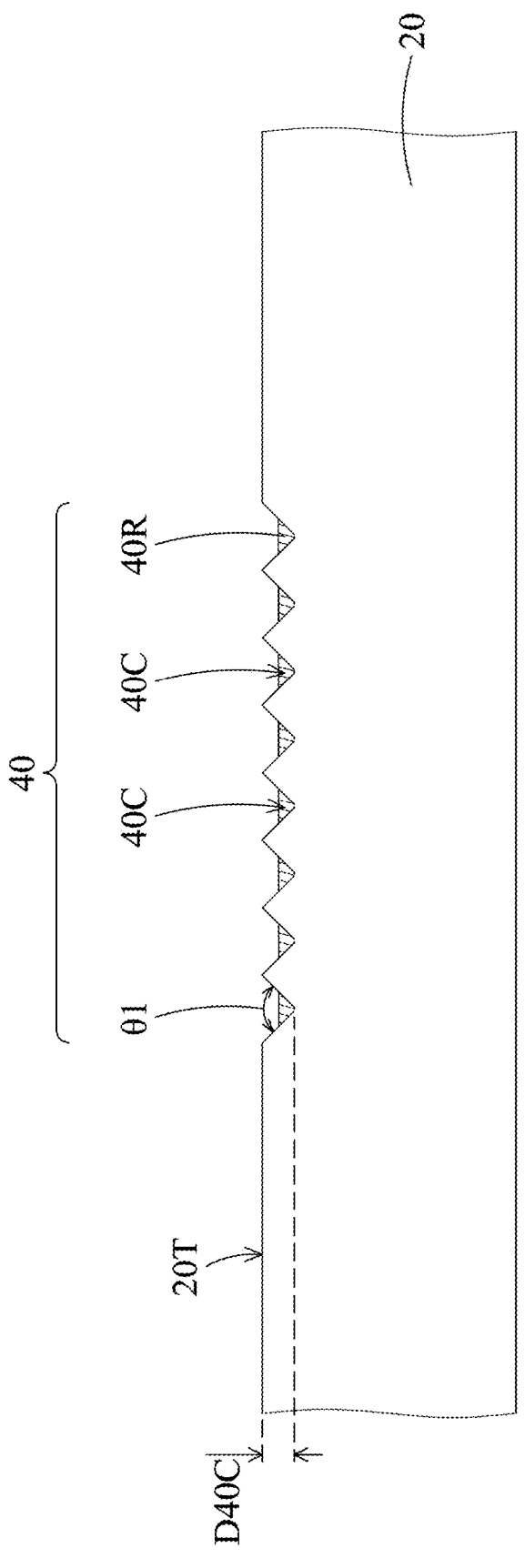

As shown in FIG. 5B to FIG. 5D, in some embodiments, the light-reflecting array structure 40 further includes a reflective layer 40R that is partially filled or completely fills the grooves 40C. For example, the reflective layer 40R may include the same or similar material to the reflective layer 40F shown in FIG. 5A, and may be formed by screen or stencil printing followed by baking and drying for example.

As shown in FIG. 5B, the reflective layer 40R completely fills the grooves 40C and exceeds the grooves 40C. In this embodiment, the minimum depth D40R1 of the reflective layer 40R is within a range from 0 to about 0.15 mm, while the maximum depth D40R2 of the reflective layer 40R is within a range from about 0.2 mm to about 2 mm. Furthermore, the minimum depth D40R1 of the reflective layer 40R may be within a range from 0 to about 0.05 mm, while the maximum depth D40R2 of the reflective layer 40R may be within a range from about 0.2 mm to about 1 mm. In other words, the thickness by which the reflective layer 40R exceeds the grooves 40C is approximately equal to the minimum depth D40R1 of the reflective layer 40R.

As shown in FIG. 5C, the reflective layer 40R completely fills the grooves 40C. That is, in this embodiment, the maximum depth of the reflective layer 40R is approximately equal to the maximum depth D40C of the grooves 40C. As shown in FIG. 5D, the reflective layer 40R partially fills the grooves 40C. That is, in this embodiment, the maximum depth of the reflective layer 40R is less than the maximum depth D40C of the grooves 40C.

Figure 5E:
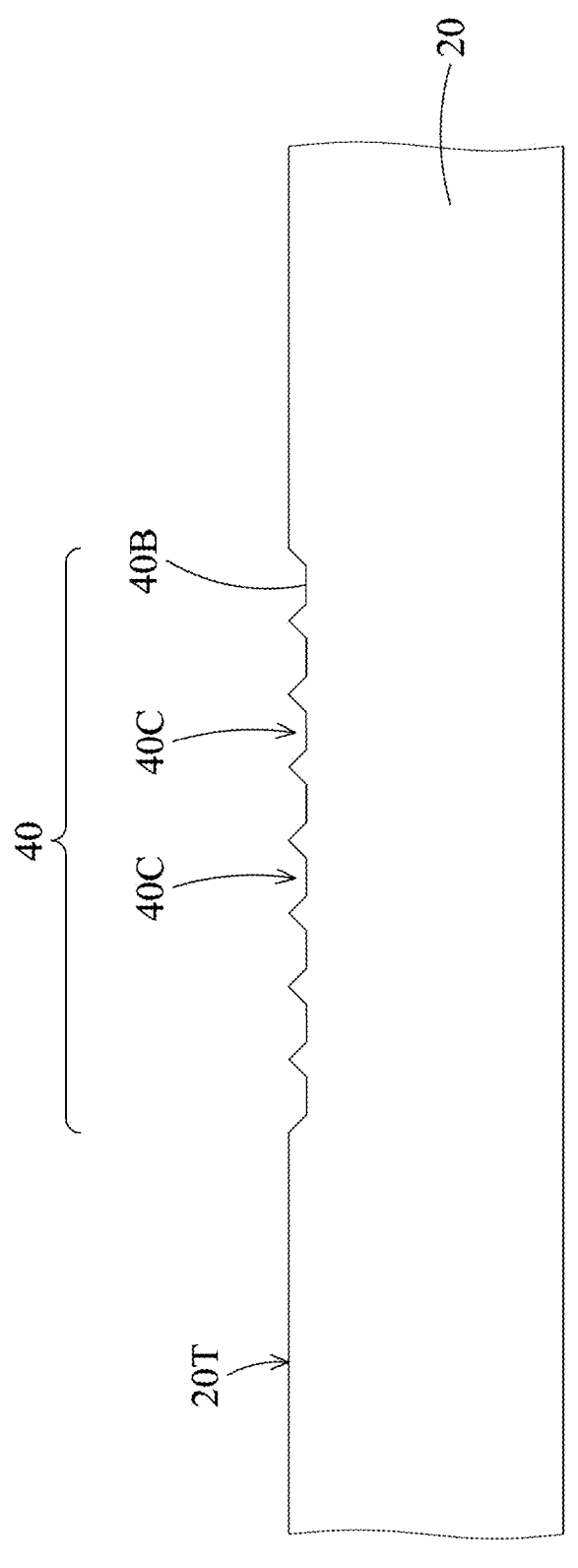

As shown in FIG. 5E, in some embodiments, each groove 40C of the light-reflecting array structure 40 has a flat bottom 40B. It should be noted that the shape of each groove 40C in the light-reflecting array structure 40 may be adjusted based on actual needs and is not limited to the embodiments mentioned above.

Figure 6A:
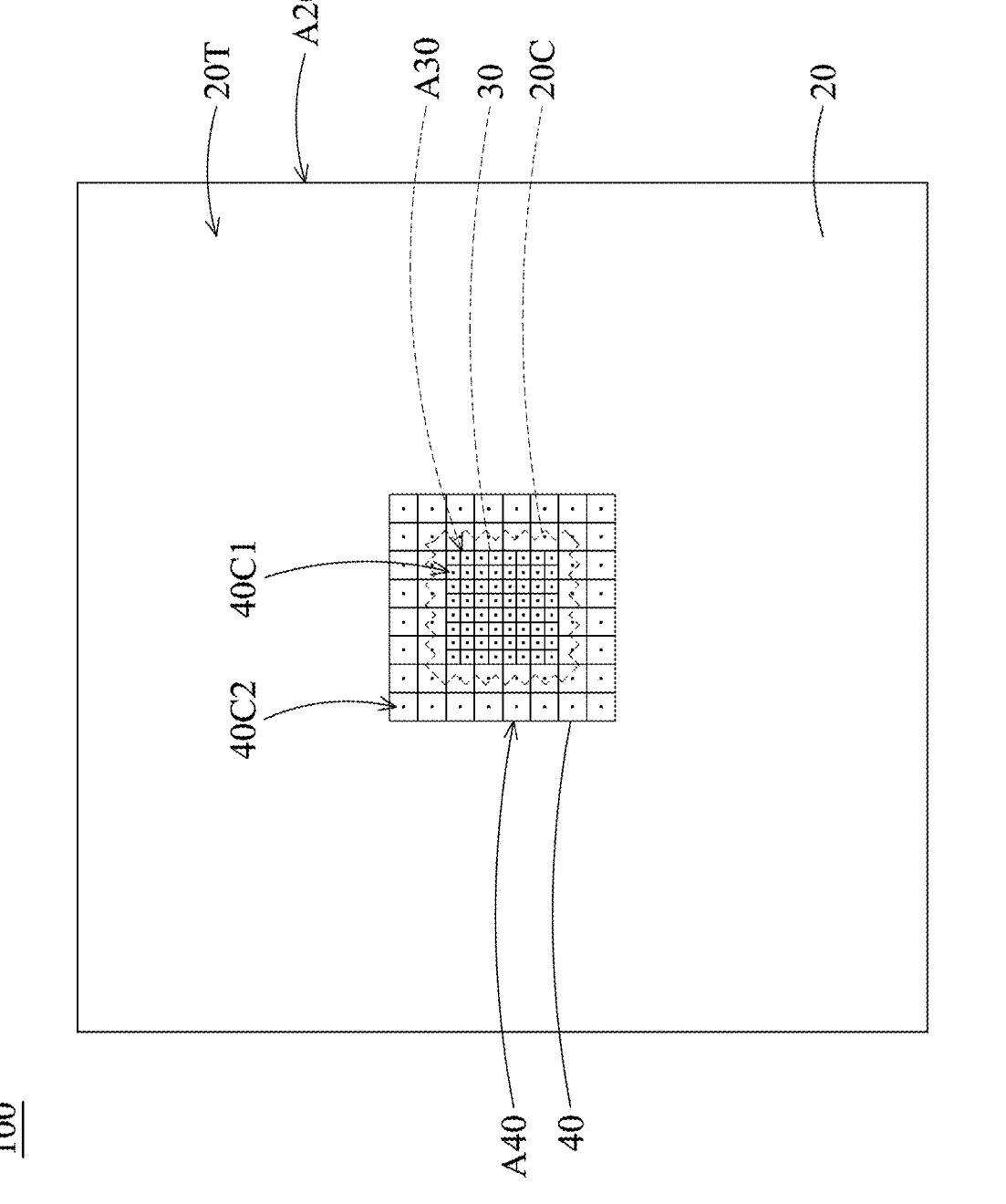
FIG. 6A is a top view illustrating the light-modulating unit according to some other embodiments of the present disclosure.
Figure 6B:
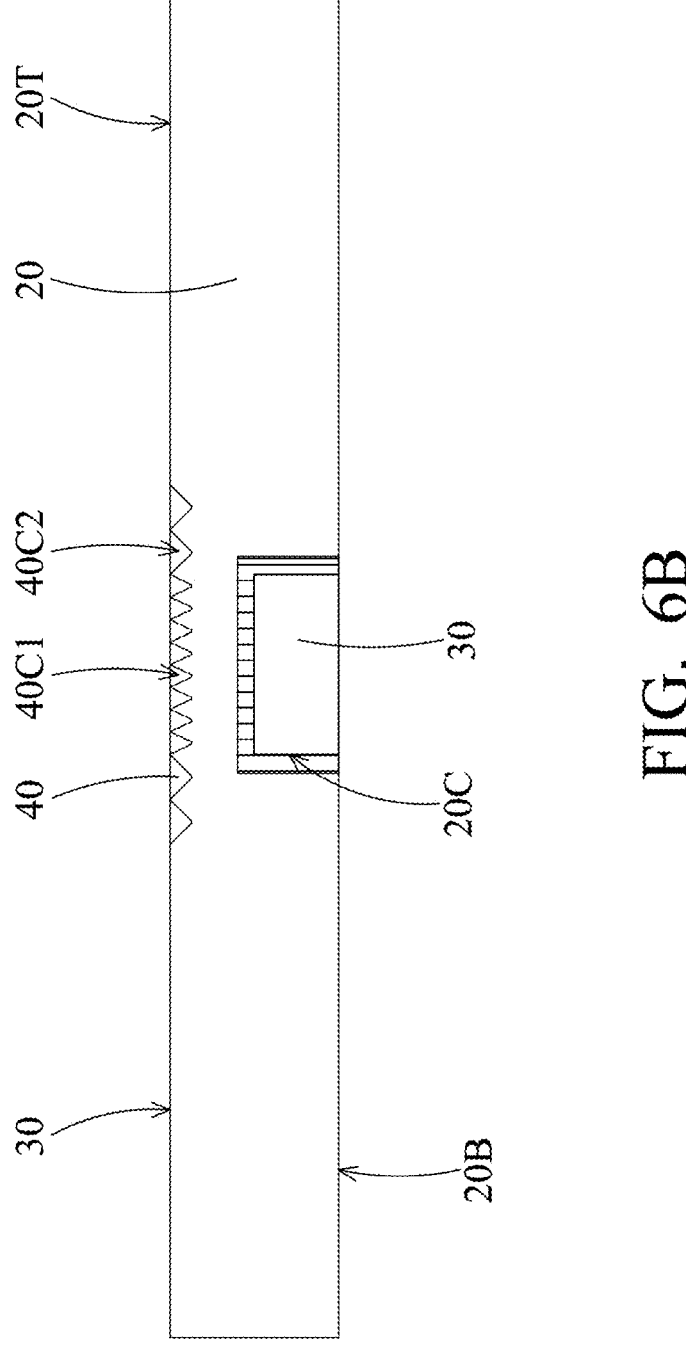
FIG. 6B is a cross-sectional view illustrating the light-modulating unit according to some other embodiments of the present disclosure.
Figure 7:
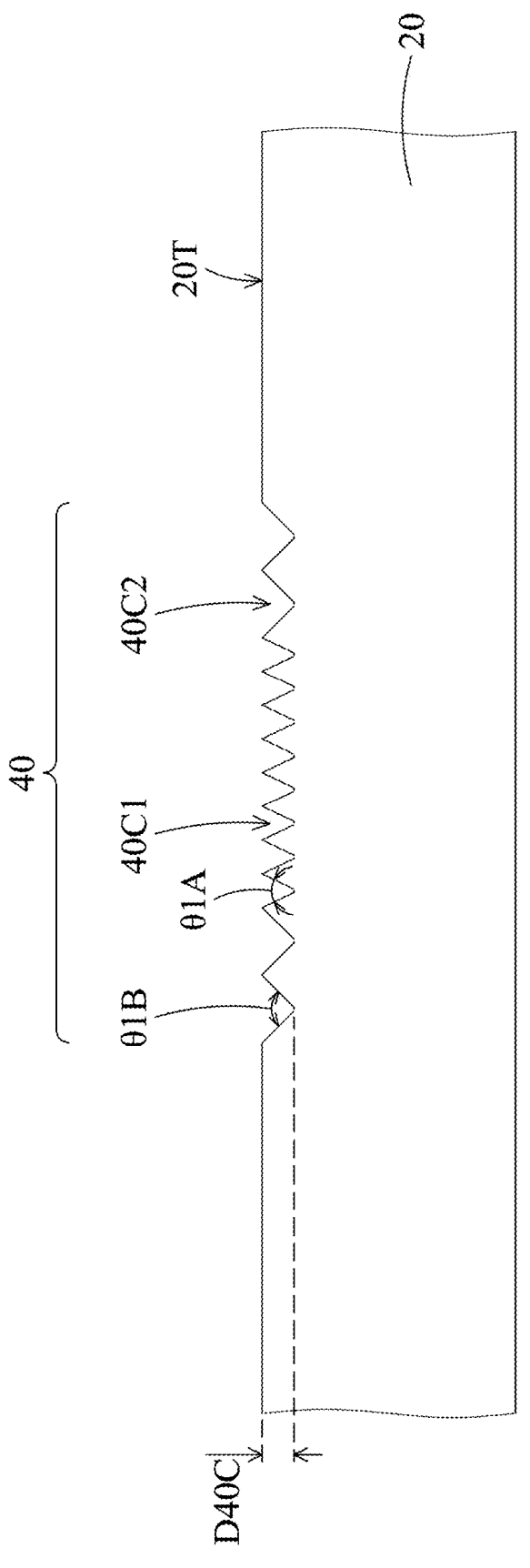
FIG. 7 is an enlarged cross-sectional view illustrating the light-modulating structure according to some other embodiments of the present disclosure.

FIG. 6A is a top view illustrating the light-modulating unit 100 according to some other embodiments of the present disclosure. FIG. 6B is a cross-sectional view illustrating the light-modulating unit 100 according to some other embodiments of the present disclosure. FIG. 7 is an enlarged cross-sectional view illustrating the light-modulating structure 20 according to some other embodiments of the present disclosure. Similarly, some components of the light-modulating unit 100 have been omitted in FIG. 6A to FIG. 7 for the sake of brevity. Additionally, FIG. 6A to FIG. 7 may not correspond exactly to each other.

As shown in FIG. 6A to FIG. 7, in some embodiments, the light-reflecting array structure 40 includes multiple first sub-grooves 40C1 and multiple second sub-grooves 40C2 that surround the first sub-grooves 40C1, and the first included angle $\theta 1A$ of each first sub-groove 40C1 is smaller than the first included angle $\theta 1B$ of each second sub-groove 40C2.

Figure 8A:
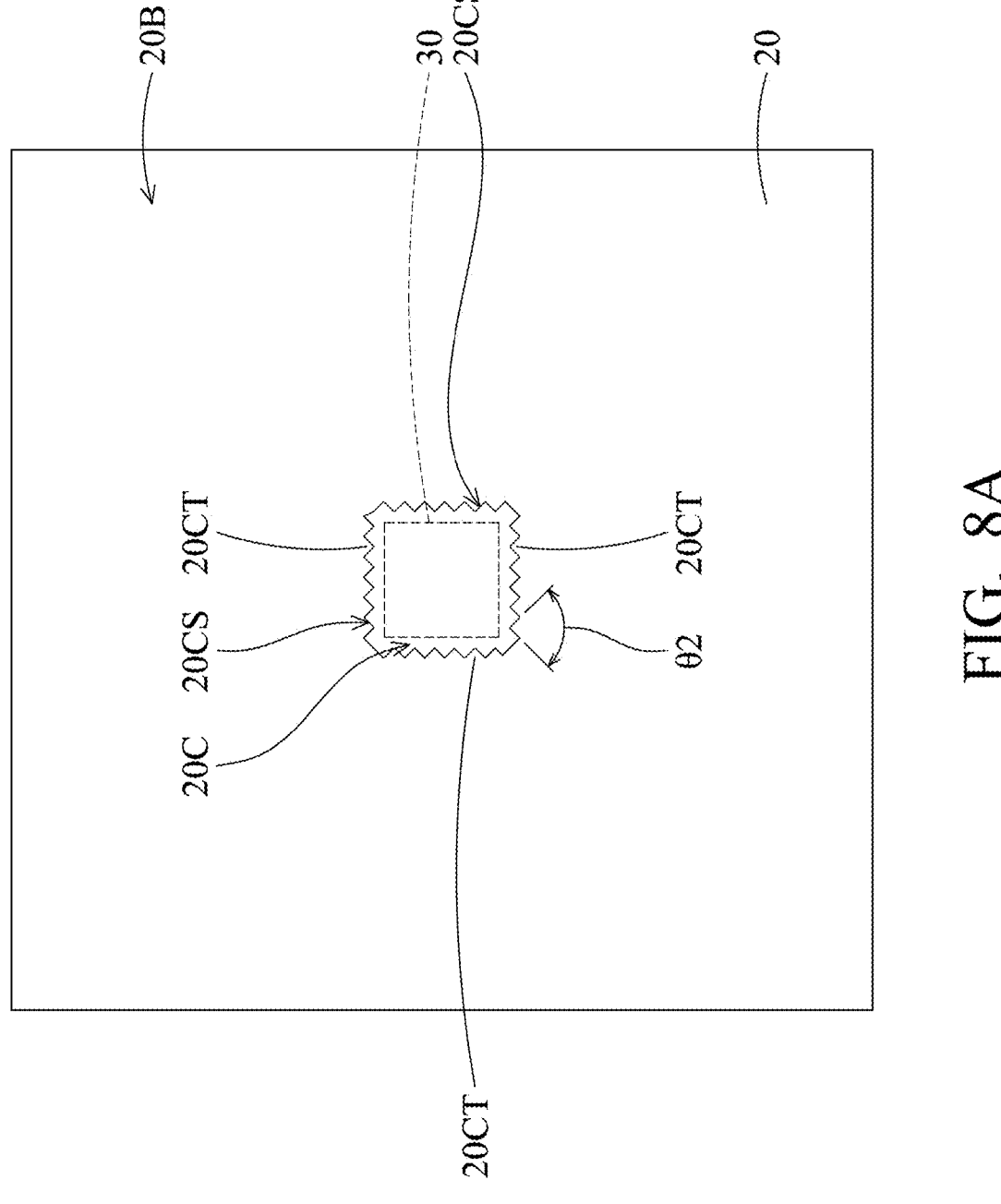
FIG. 8A is a bottom view illustrating the light-modulating structure according to some embodiments of the present disclosure.
Figure 8B:
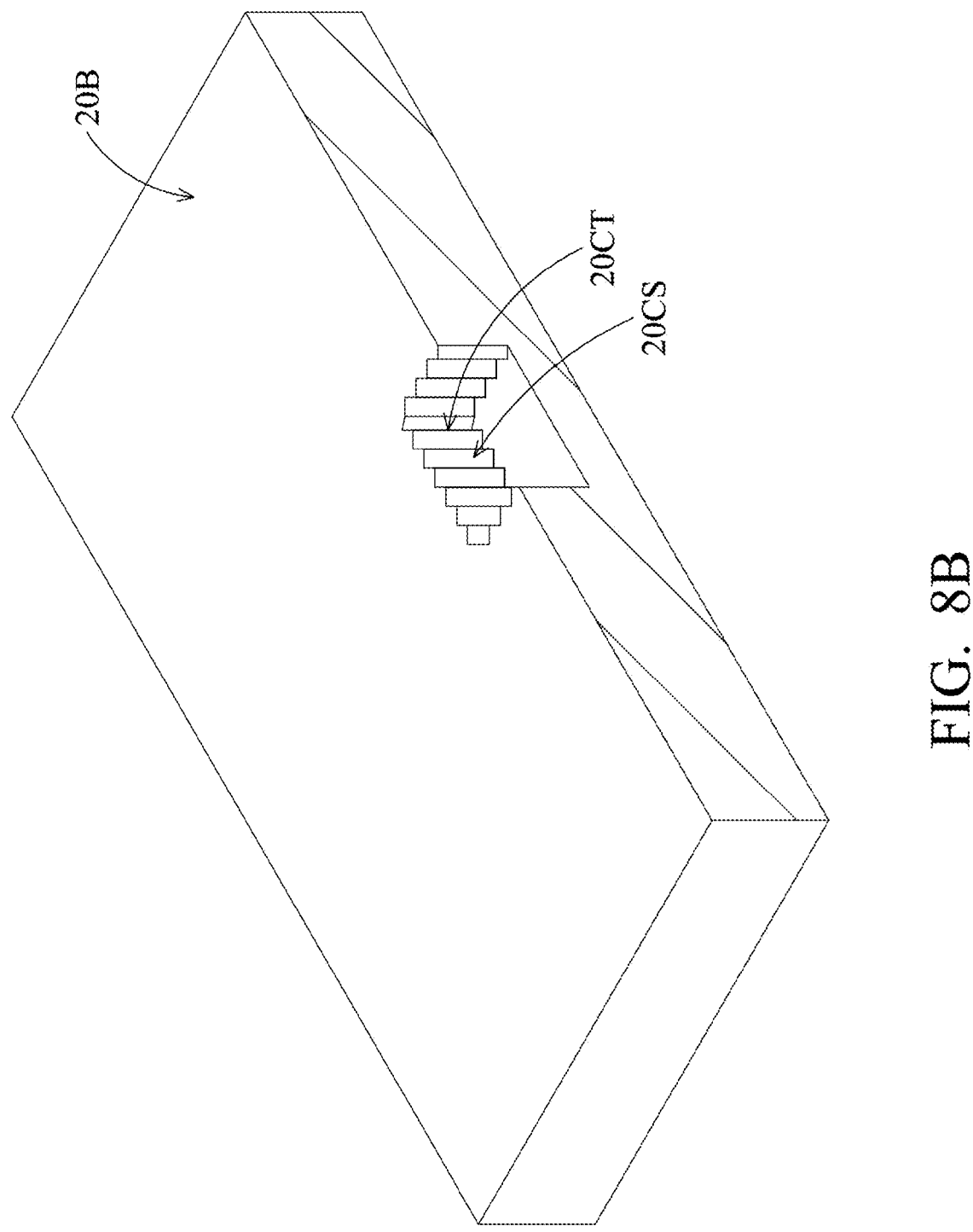
FIG. 8B is a partial perspective view from below illustrating the light-modulating structure of FIG. 8A according to some embodiments of the present disclosure.
Figure 8C:
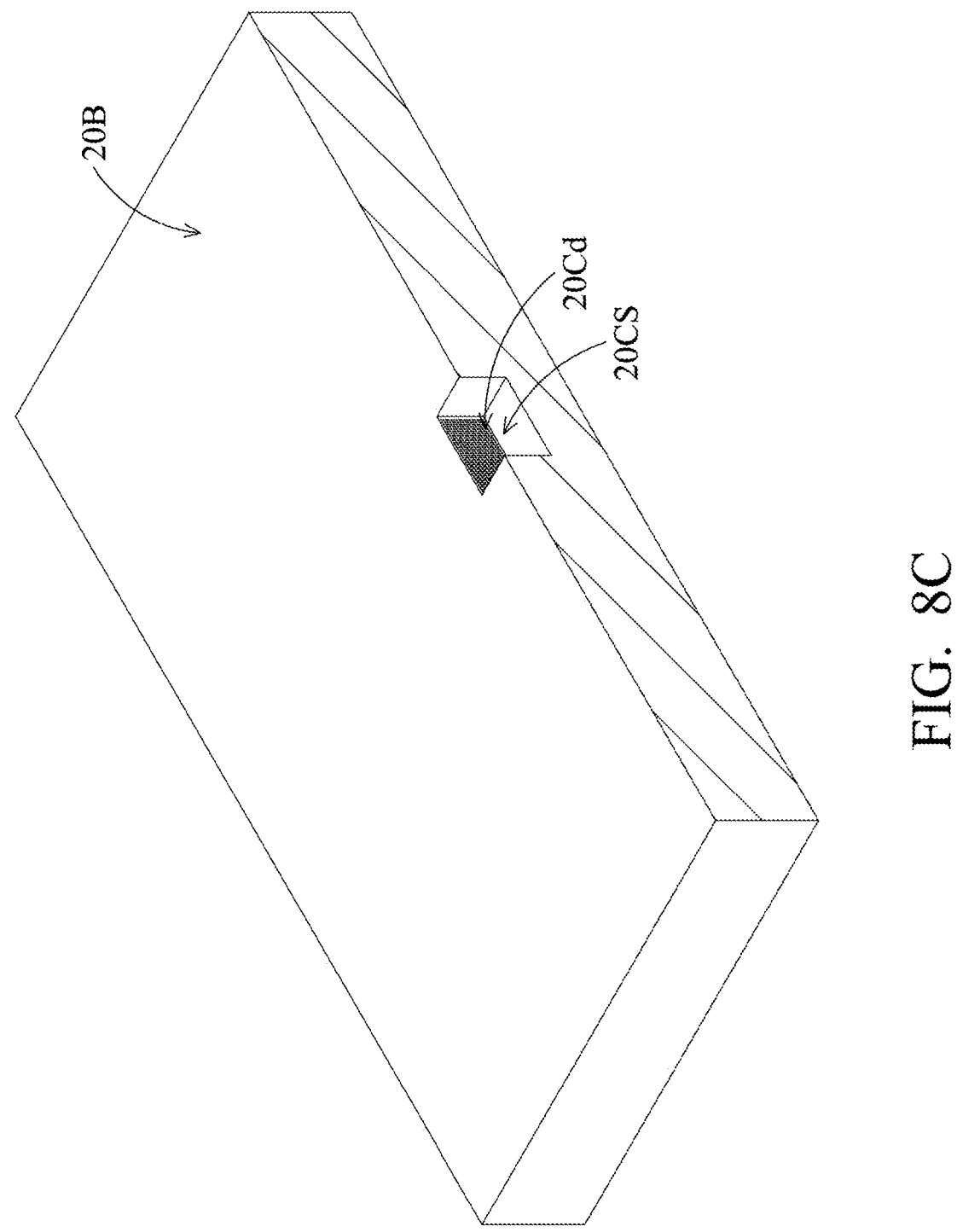
FIG. 8C is a partial perspective view from below illustrating the light-modulating structure according to some other embodiments of the present disclosure.

FIG. 8A is a bottom view illustrating the light-modulating structure 20 according to some embodiments of the present disclosure. FIG. 8B is a partial perspective view from below illustrating the light-modulating structure 20 of FIG. 8A according to some embodiments of the present disclosure. FIG. 8C is a partial perspective view from below illustrating the light-modulating structure 20 according to some other embodiments of the present disclosure. In FIG. 8A, the light-emitting element 30 is also depicted in dashed lines to illustrate the positional relationship between the light-emitting element 30 and the light-modulating structure 20. Similarly, some components of the light-modulating structure 20 have been omitted in FIG. 8A to FIG. 8C for the sake of brevity. Additionally, FIG. 8A and FIG. 8B may not correspond exactly to each other.

As shown in FIG. 8A and FIG. 8B, in some embodiments, there are multiple microstructures on the sidewalls 20CS of the housing cavity 20C of the light-modulating structure 20, and the microstructures include triangular prism structures 20CT. Moreover, as shown in FIG. 8A, in some embodiments, in a bottom view, each triangular prism structure has a second included angle $\theta 2$, and the second included angle $\theta 2$ is greater than about 30 degrees.

As shown in FIG. 8C, in some embodiments, there are multiple microstructures on the sidewalls 20CS of the housing cavity 20C of the light-modulating structure 20, and the microstructures include dots 20Cd. For example, multiple dots may be formed on the sidewalls 20CS of the housing cavity 20C using dot printing, but the present disclosure is not limited thereto.

In the embodiments shown in FIG. 8A to FIG. 8C, the sidewalls 20CS of the housing cavity 20C may be considered as the light incident surface of the light-modulating structure 20, and the distribution of triangular prism structures or dots may be used to disrupt the light emitted by the light-emitting structure 30 being reflected, thereby increasing the light incident efficiency of the light incident surface.

Figure 9A:
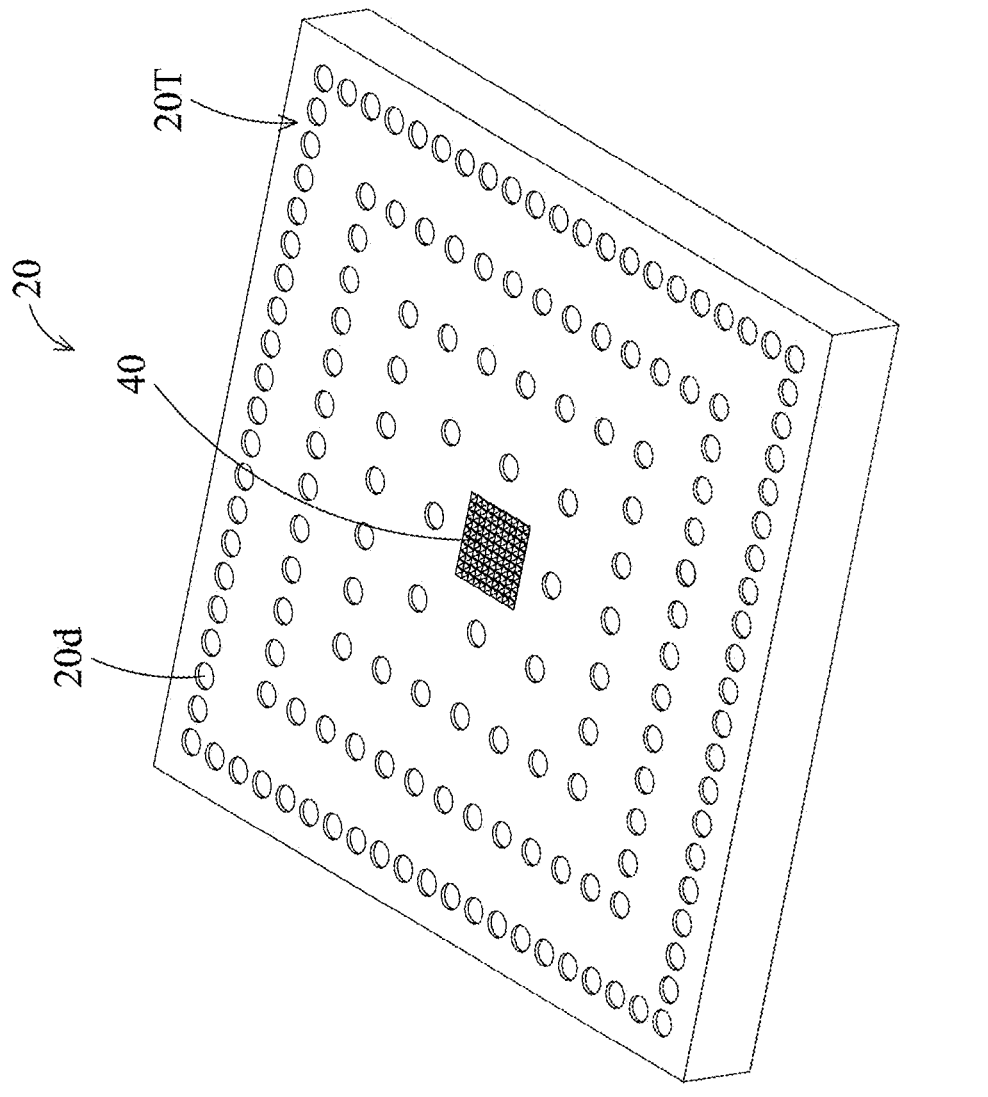
FIG. 9A is a partial perspective view from above illustrating the light-modulating unit according to some embodiments of the present disclosure.
Figure 9B:
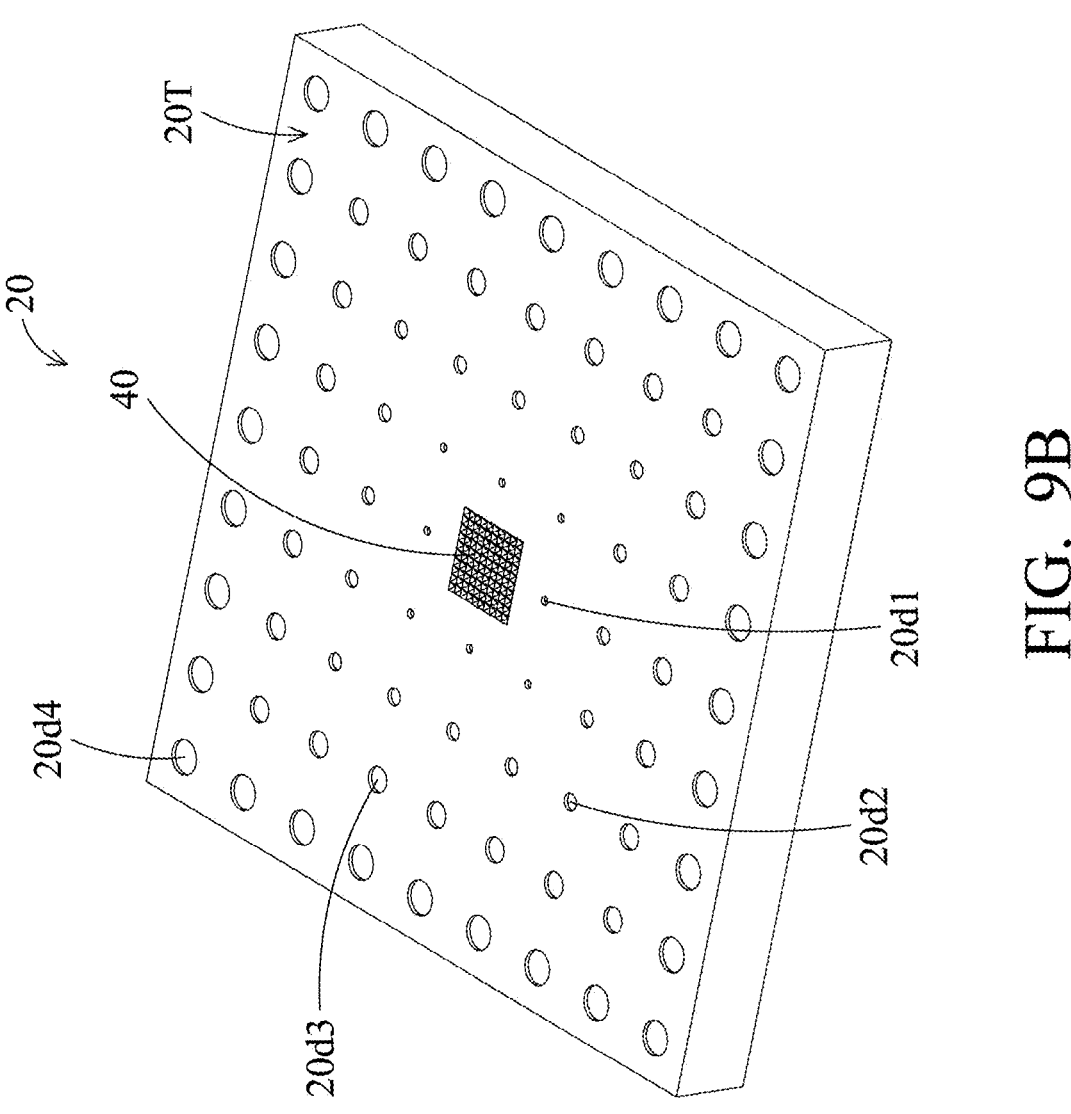
FIG. 9B is a partial perspective view from above illustrating the light-modulating unit according to some other embodiments of the present disclosure.

FIG. 9A is a partial perspective view from above illustrating the light-modulating unit 102 according to some embodiments of the present disclosure. FIG. 9B is a partial perspective view from above illustrating the light-modulating unit 102' according to some other embodiments of the present disclosure. Similarly, some components of the light-modulating units 102, 102' have been omitted in FIG. 9A and FIG. 9B for the sake of brevity.

As shown in FIG. 9A, in some embodiments, the light-modulating unit 102 further includes multiple first light-guiding dots 20d that are disposed on the light emission surface 20T of the light-modulating structure 20 and arranged in multiple circles around the light-reflecting array structure 40. Moreover, in this embodiment, as shown in the top view of FIG. 9A, each of the first light-guiding dots 20d has the same size, and the multiple first light-guiding dots 20d are arranged from sparse to dense in the direction away from the light-reflecting array structure 40.

As shown in FIG. 9B, in some embodiments, the light-modulating unit 102' further includes multiple first light-guiding dots 20d1, 20d2, 20d3, and 20d4 that are disposed on the light emission surface 20T of the light-modulating structure 20 and arranged in multiple circles around the light-reflecting array structure 40. Moreover, in this embodiment, as shown in the top view of FIG. 9B, the sizes of the first light-guiding dots 20d1, 20d2, 20d3, and 20d4 increase in the direction away from the light-reflecting array structure 40. Specifically, the size (diameter) of the first light-guiding dot 20d1 is smaller than the size (diameter) of the first light-guiding dot 20d2, the size (diameter) of the first light-guiding dot 20d2 is smaller than the size (diameter) of the first light-guiding dot 20d3, and the size (diameter) of the first light-guiding dot 20d3 is smaller than the size (diameter) of the first light-guiding dot 20d4.

Figure 10A:
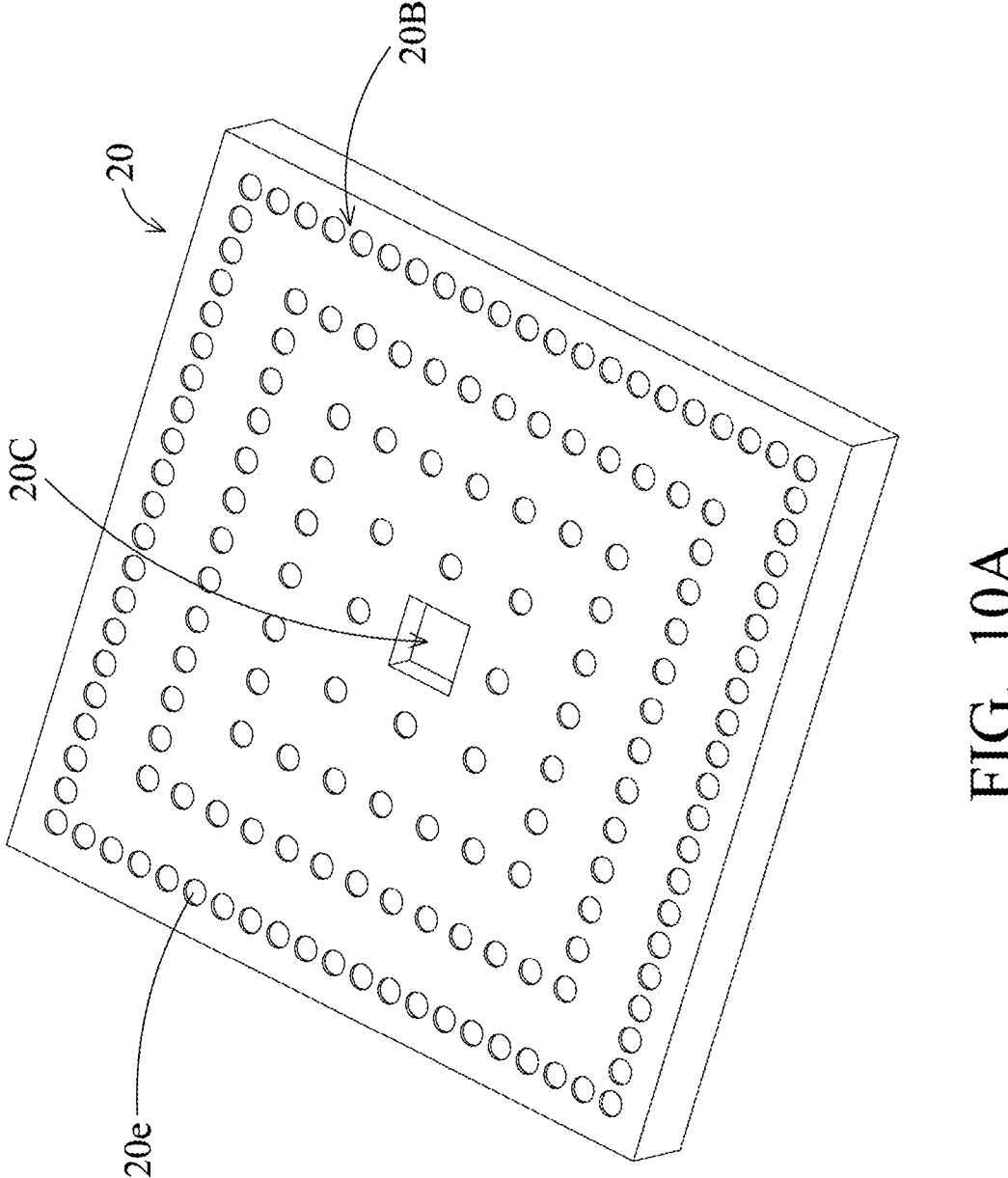
FIG. 10A is a perspective view from bottom illustrating the light-modulating unit according to some embodiments of the present disclosure.
Figure 10B:
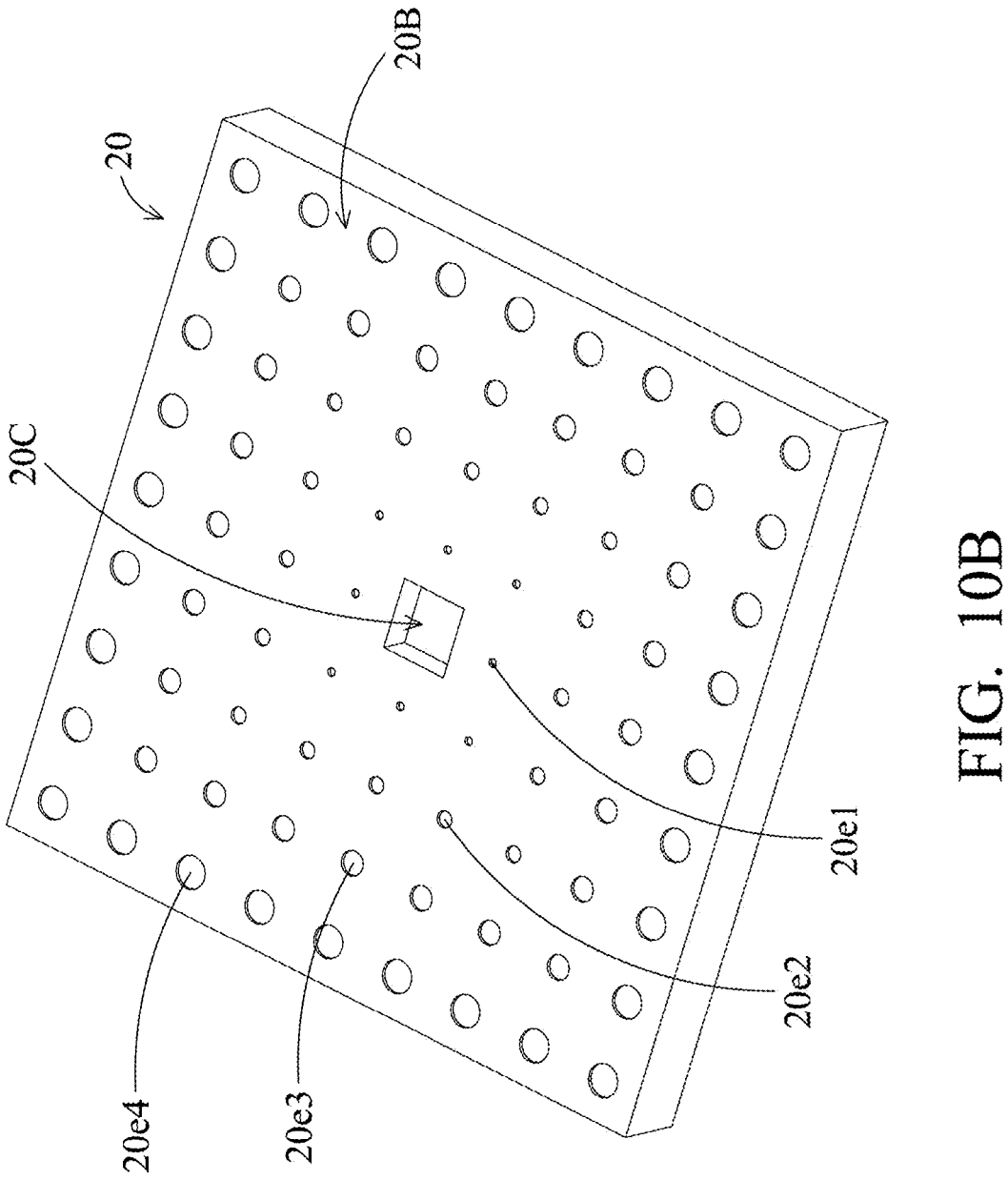
FIG. 10B is a perspective view from bottom illustrating the light-modulating unit according to some other embodiments of the present disclosure.

FIG. 10A is a perspective view from bottom illustrating the light-modulating unit 104 according to some embodiments of the present disclosure. FIG. 10B is a perspective view from bottom illustrating the light-modulating unit 104' according to some other embodiments of the present disclosure. Similarly, some components of the light-modulating units 104, 104' have been omitted in FIG. 10A and FIG. 10B for the sake of brevity.

As shown in FIG. 10A, in some embodiments, the light-modulating unit 104 further includes multiple second light-guiding dots 20e that are disposed on the bottom surface 20B of the light-modulating structure 20 and are arranged in multiple circles around the housing cavity 20C. Moreover, in this embodiment, as shown in the bottom view of FIG. 10A, each of the second light-guiding dots 20e has the same size, and the multiple second light-guiding dots 20e arranged from sparse to dense in the direction away from the housing cavity 20C of the light-modulating structure 20.

As shown in FIG. 10B, in some embodiments, the light-modulating unit 104' further includes multiple second light-guiding dots 20e1, 20e2, 20e3, and 20e4 that are disposed on the bottom surface 20B of the light-modulating structure 20 and arranged in multiple circles around the housing cavity 20C. Moreover, in this embodiment, as shown in the bottom view of FIG. 10B, the sizes of the second light-guiding dots 20e1, 20e2, 20e3, and 20e4 increase in the direction away from the housing cavity 20C of the light-modulating structure 20. Specifically, the size (diameter) of the second light-guiding dot 20e1 is smaller than the size (diameter) of the second light-guiding dot 20e2, the size (diameter) of the second light-guiding dot 20e2 is smaller than the size (diameter) of the second light-guiding dot 20e3, and the size (diameter) of the second light-guiding dot 20e3 is smaller than the size (diameter) of the second light-guiding dot 20e4.

In some embodiments, the first light-guiding dots 20d (or 20d1, 20d2, 20d3, and 20d4) and the second light-guiding dots 20e (or 20e1, 20e2, 20e3, and 20e4) are circular in shape. The diameters of the first light-guiding dots 20d (or 20d1, 20d2, 20d3, and 20d4) are within a range from about 10 μm to about 100 μm, and the diameters of the second light-guiding dots 20e (or 20e1, 20e2, 20e3, and 20e4) are within a range from about 10 μm to about 100 μm. The first light-guiding dots 20d (or 20d1, 20d2, 20d3, and 20d4) and/or the second light-guiding dots 20e (or 20e1, 20e2, 20e3, and 20e4) may further enhance the light emission efficiency and/or the uniformity of the light emitted by the light-emitting structure 30.

Figure 11:
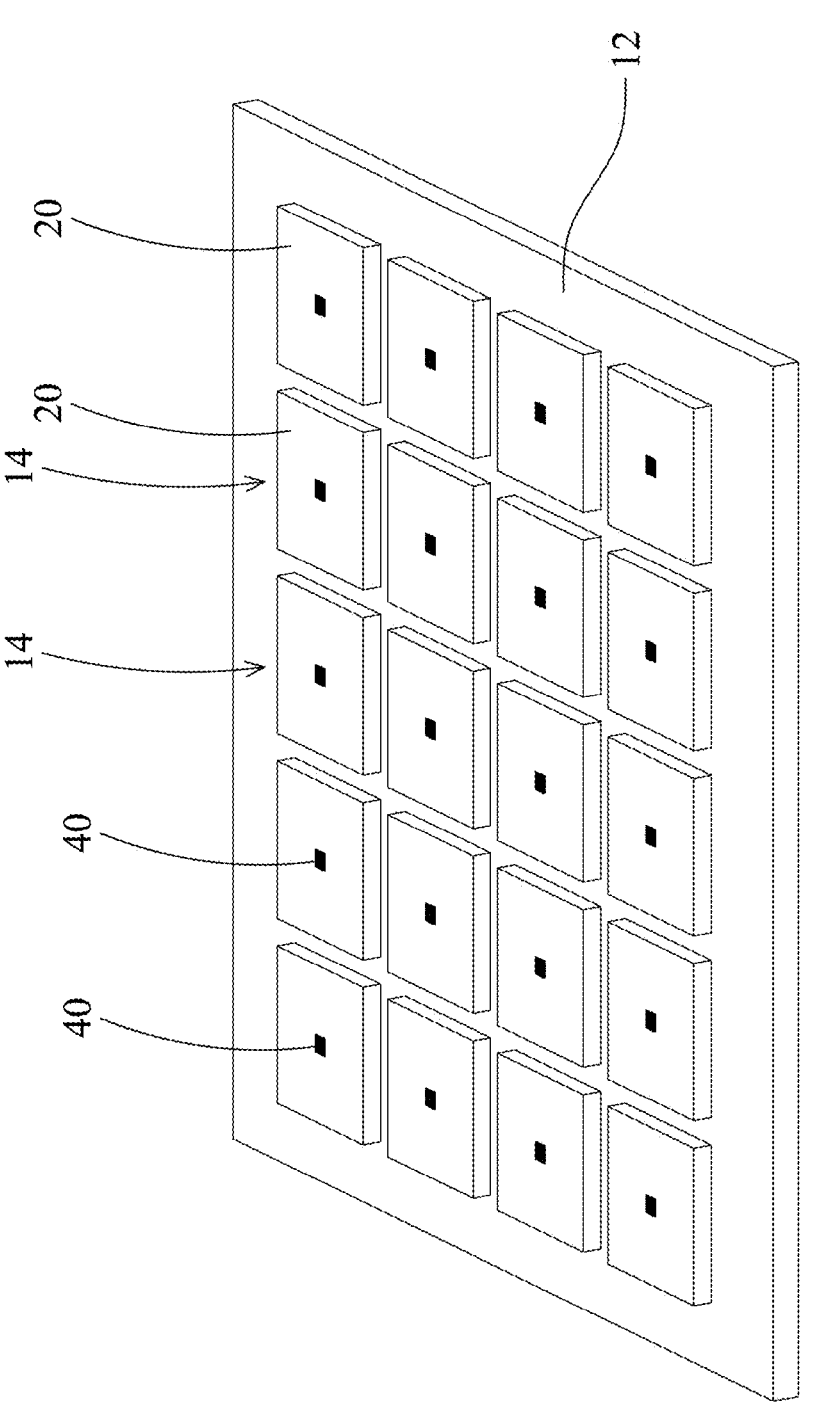
FIG. 11 is a perspective schematic diagram illustrating multiple light-modulating structures assembled on a substrate according to some embodiments of the present disclosure.
Figure 12:
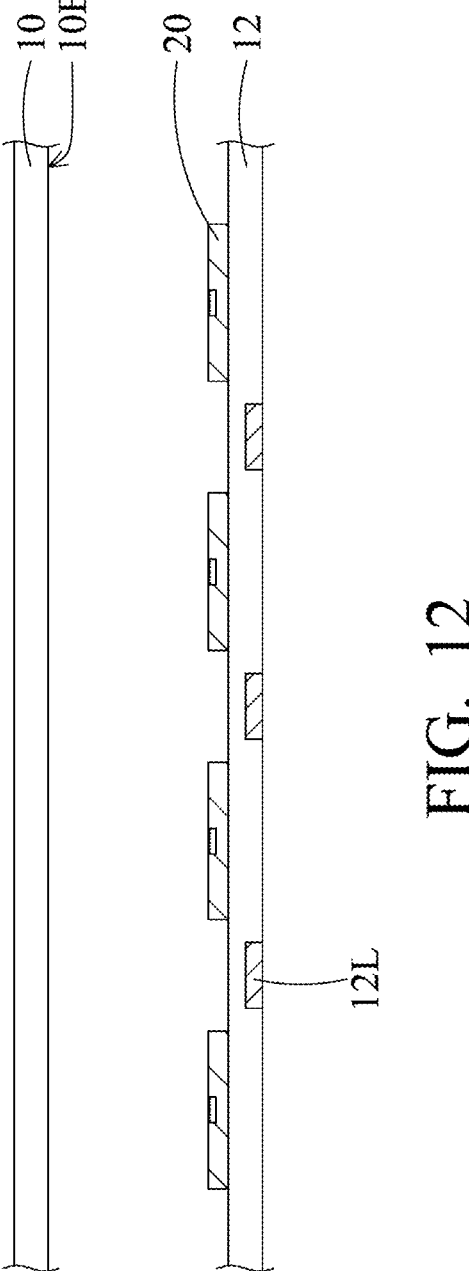
FIG. 12 is a partial cross-sectional view illustrating the display device according to some embodiments of the present disclosure.

FIG. 11 is a perspective schematic diagram illustrating multiple light-modulating structures 20 assembled on a substrate 12 according to some embodiments of the present disclosure. FIG. 12 is a partial cross-sectional view illustrating the display device 1 according to some embodiments of the present disclosure. Similarly, some components have been omitted in FIG. 11 and FIG. 12 for the sake of brevity.

As shown in FIG. 11 and FIG. 12, in some embodiments, the display device 1 includes a display panel 10. For example, the display panel 10 may be a liquid crystal display panel, but the present disclosure is not limited thereto. In some embodiments, the display device 1 also includes a backlight module BK that is disposed on the back side of the display panel 10B. As shown in FIG. 11, in some embodiments, the backlight module BK includes a substrate 12 that has multiple light-modulating zones 14, and each light-modulating zone 14 includes a light-modulating unit 20. Moreover, the display device 1 may be widely applied in various electronic devices, such as mobile phones, laptops, desktop monitors, flat-screen TVs, information display boards, wearable electronic products, automotive dashboards, etc.

The substrate 12 is a substrate that has conductive circuitry. For example, the substrate 12 may be a transparent substrate or an opaque substrate. Moreover, the substrate 12 may be a rigid circuit substrate, which may include elemental semiconductors (e.g., silicon or germanium), compound semiconductors (e.g., silicon carbide (SiC), gallium arsenide (GaAs), indium arsenide (InAs), or indium phosphide (InP)), alloy semiconductors (e.g., SiGe, SiGeC, GaAsP, or GaInP), other appropriate semiconductors, or a combination thereof. Alternatively, the substrate 12 may be a flexible circuit substrate, a semiconductor-on-insulator (SOI) substrate, a printed circuit board, a metal substrate, a ceramic substrate, a sapphire substrate, a glass substrate, etc. The glass substrate may include thin-film transistors (TFT).

As shown in FIG. 12, in some embodiments, the display device 1 further includes multiple driving devices 12L that are disposed on the substrate 12 and drive the light-modulating units 20 corresponding to each light-modulating zone 14. For example, the driving device 12L may include driver ICs and various conductive components (e.g., conductive lines, vias, or thin-film transistors). For example, the aforementioned conductive components may include aluminum (Al), copper (Cu), tungsten (W), alloys thereof, other appropriate conductive materials, or a combination thereof, but the present disclosure is not limited thereto.

Although the embodiment shown in FIG. 12 is described by taking the light-modulating unit 20 being applied to the backlight module BK of the display device 1 as an example, the present disclosure is not limited thereto. In some other embodiments, the light-modulating unit 20 may also be applied to other light-emitting parts of the display device 1, automotive lighting, or other lighting systems.

As noted above, the light-modulating unit and the display device using the same according to the embodiments of the present disclosure include a light-reflecting array structure. The light-reflecting array structure may convert a light source (e.g., LEDs) into a large-area planar light source that has uniformly bright within a thin thickness and achieve local dimming. Moreover, in some embodiments, a large-sized backlight modules of a display device may be assembled by combining multiple light-modulating units.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. A light-modulating unit, comprising:

a light-modulating structure having a light-emitting surface and a bottom surface that are opposite to each other, wherein the light-modulating structure comprises a housing cavity that extends from the bottom surface into an interior of the light-modulating structure;

a light-emitting element disposed in the housing cavity; and a light-reflecting array structure disposed on the light-emitting surface and directly above the light-emitting element, wherein the light-reflecting array structure comprises grooves that form an m×n array, and m and n are positive integers greater than or equal to 2, wherein in a cross-sectional view, each of the grooves has a first included angle, and the first included angle is less than 120 degrees, and wherein the grooves comprise a plurality of first sub-grooves and a plurality of second sub-grooves, the second sub-grooves surround the first sub-grooves, and the first included angle of each of the first sub-grooves is less than the first included angle of each of the second sub-grooves.

2. The light-modulating unit as claimed in claim 1, wherein in a top view, an area of the light-reflecting array structure is greater than or equal to an area of the light-emitting element and less than an area of the light-emitting surface of the light-modulating structure.

3. The light-modulating unit as claimed in claim 1, wherein the light-reflecting array structure further comprises a reflective layer that is coated on at least part of surfaces of the grooves.

4. The light-modulating unit as claimed in claim 1, wherein the light-reflecting array structure further comprises a reflective layer that is partially filled or completely fills the grooves.

5. The light-modulating unit as claimed in claim 1, wherein there are microstructures on sidewalls of the housing cavity, and the microstructures comprise triangular prism structures or dots.

6. The light-modulating unit as claimed in claim 5, wherein in a bottom view, each of the triangular prism structures has a second included angle, and the second included angle is greater than 30 degrees.

7. The light-modulating unit as claimed in claim 1, further comprising: a plurality of first light-guiding dots disposed on the light-emitting surface of the light-modulating structure and surrounding the light-reflecting array structure.

8. The light-modulating unit as claimed in claim 7, wherein in a top view, the first light-guiding dots are arranged from sparse to dense in a direction away from the light-reflecting array structure.

9. The light-modulating unit as claimed in claim 7, wherein in a top view, sizes of the first light-guiding dots increase in a direction away from the light-reflecting array structure.

10. The light-modulating unit as claimed in claim 1, further comprising: a plurality of second light-guiding dots disposed on the bottom surface of the light-modulating structure and surrounding the housing cavity.

11. The light-modulating unit as claimed in claim 10, wherein in a bottom view, the second light-guiding dots are arranged from sparse to dense in a direction away from the housing cavity.

12. The light-modulating unit as claimed in claim 10, wherein in a bottom view, sizes of the second light-guiding dots increases in a direction away from the housing cavity.

13. The light-modulating unit as claimed in claim 1, wherein in a top view, a shape of the light-modulating structure is rectangular.

14. A display device, comprising:

a display panel;

a backlight module disposed on a back side of the display panel, wherein the backlight module comprises a substrate having a plurality of light-modulating zones, and each of the light-modulating zones comprises the light-modulating unit as claimed in claim 1; and a plurality of driving devices disposed on the substrate and driving a corresponding light-modulating unit of each of the light-modulating zones.

\* \* \* \* \*